(12) United States Patent
Song

(10) Patent No.: US 11,029,494 B2
(45) Date of Patent: Jun. 8, 2021

(54) OPTICAL IMAGING LENS ASSEMBLY

(71) Applicant: Zhejiang Sunny Optical Co., Ltd, Zhejiang (CN)

(72) Inventor: Bo Song, Zhejiang (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 244 days.

(21) Appl. No.: 16/212,377

(22) Filed: Dec. 6, 2018

(65) Prior Publication Data

US 2019/0107691 A1    Apr. 11, 2019

Related U.S. Application Data

(63) Continuation of application No. PCT/CN2017/116156, filed on Dec. 14, 2017.

(30) Foreign Application Priority Data

Jul. 25, 2017    (CN) .......................... 201710609177.5
Jul. 25, 2017    (CN) .......................... 201720903098.0

(51) Int. Cl.
*G02B 9/60*        (2006.01)
*G02B 13/00*       (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS

| | | |
|---|---|---|
| 2013/0079023 A1 | 3/2013 | Zhang et al. |
| 2015/0098137 A1 | 4/2015 | Chung et al. |
| 2016/0004034 A1* | 1/2016 | Nishihata ........... G02B 13/0045 359/714 |
| 2016/0116715 A1 | 4/2016 | Ota |
| 2017/0176720 A1* | 6/2017 | Zhao .................. G02B 13/0045 |

FOREIGN PATENT DOCUMENTS

| | | |
|---|---|---|
| CN | 204215090 | 3/2015 |
| CN | 106405796 | 2/2017 |
| CN | 106646829 | 5/2017 |
| CN | 106896481 | 6/2017 |
| CN | 107167900 | 9/2017 |

* cited by examiner

*Primary Examiner* — Joseph P Martinez
(74) *Attorney, Agent, or Firm* — Hauptman Ham, LLP

(57) ABSTRACT

The present disclosure discloses an optical imaging lens assembly. The optical imaging lens assembly includes, sequentially from an object side to an image side along an optical axis, a first lens, a second lens, a third lens, a fourth lens and a fifth lens. The first lens has a positive refractive power, an object-side surface of the first lens is a convex surface, and an image-side surface of the first lens is a concave surface. The second lens has a positive refractive power or a negative refractive power. The third lens has a negative refractive power. The fourth lens has a positive refractive power. The fifth lens has a negative refractive power, and an image-side surface of the fifth lens is a convex surface. A total effective focal length f of the optical imaging lens assembly and an entrance pupil diameter EPD of the optical imaging lens assembly satisfy: f/EPD≤1.9.

22 Claims, 12 Drawing Sheets

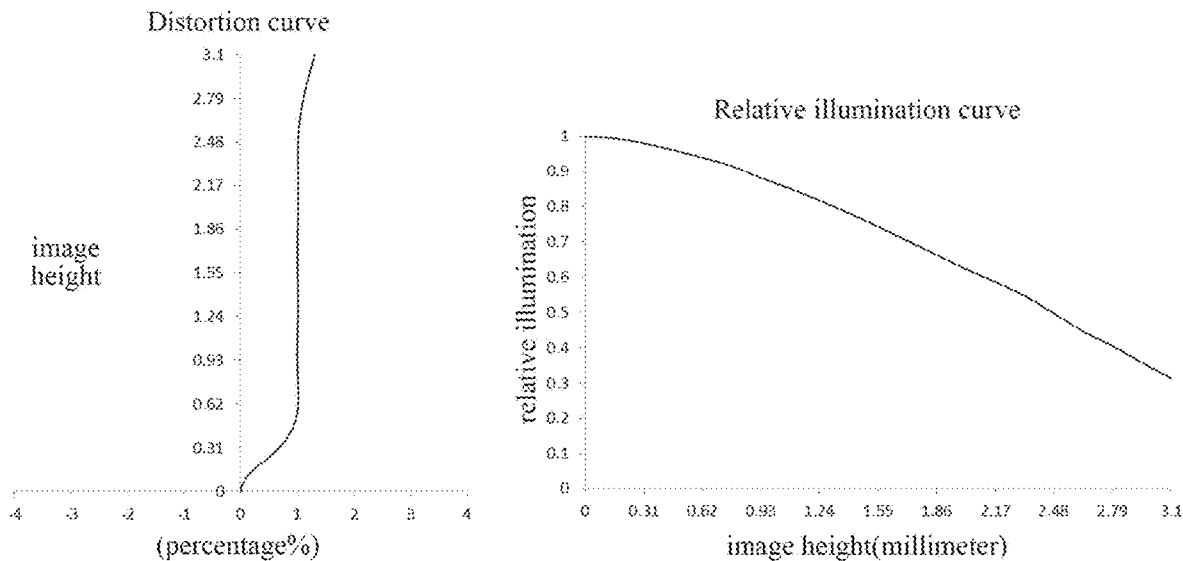
Fig. 6C
Fig. 6D
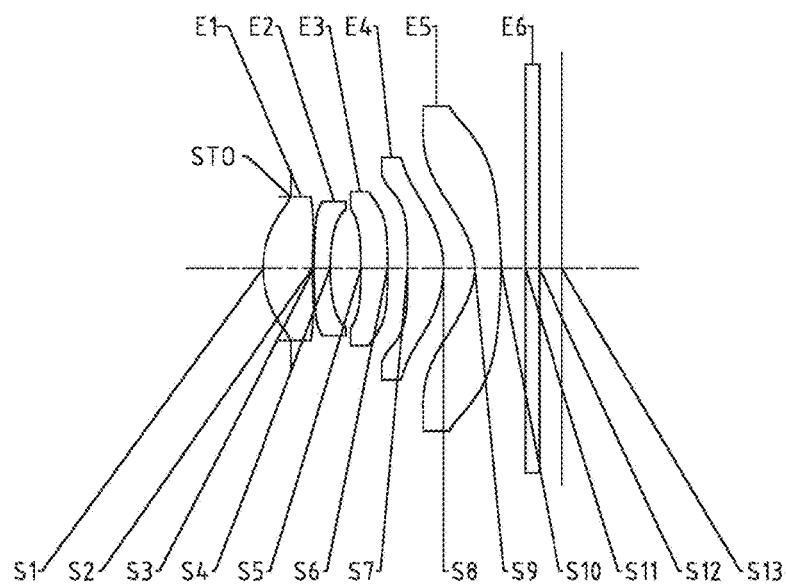
Fig. 7

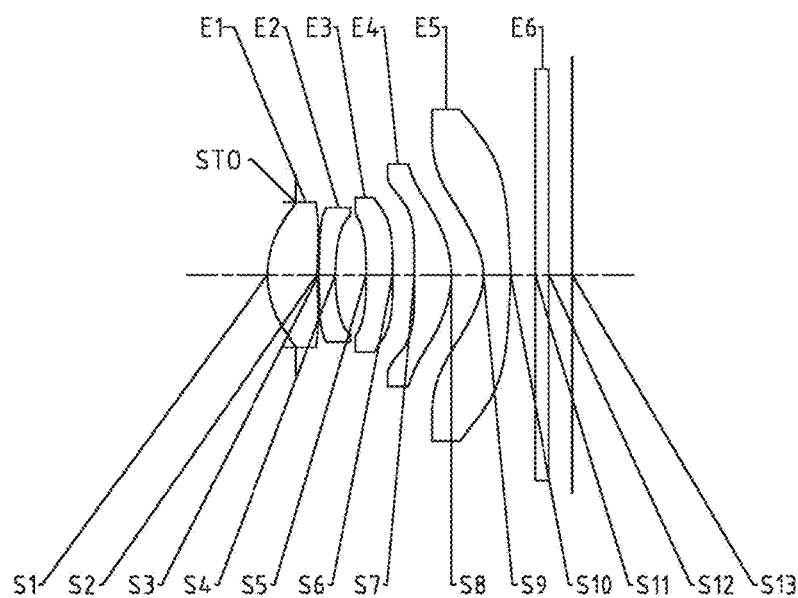
Fig. 9
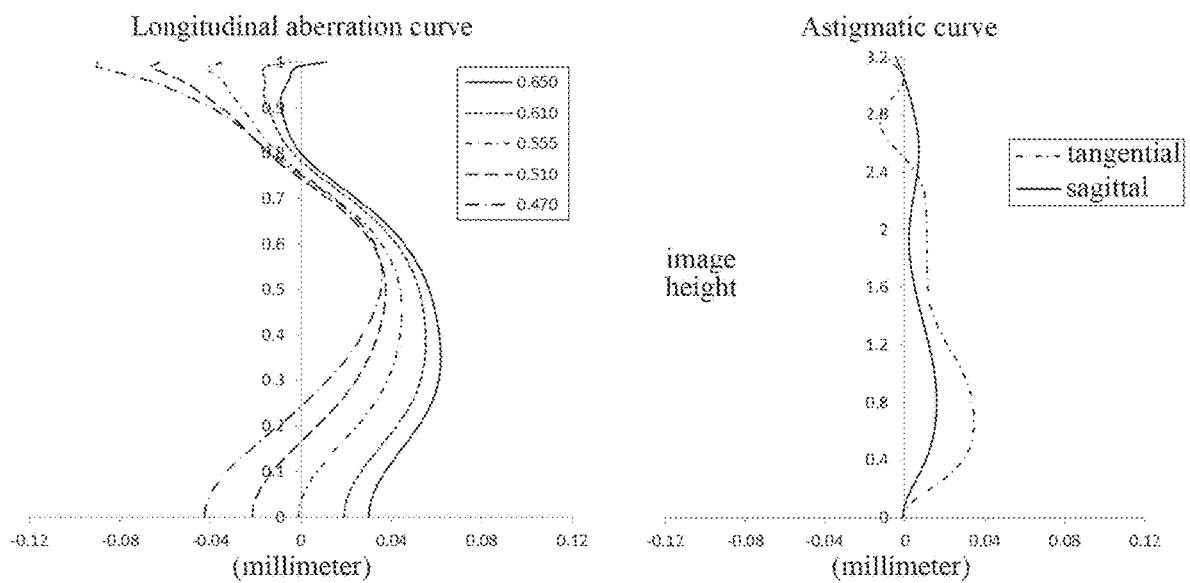
Fig. 10A
Fig. 10B

OPTICAL IMAGING LENS ASSEMBLY

CROSS-REFERENCE TO RELATED APPLICATIONS

This is a continuation of International Application PCT/CN2017/116156, with an international filing date of Dec. 14, 2017, which claims priorities and rights from Chinese Patent Application No. 201710609177.5, filed with the China National Intellectual Property Administration (CNIPA) on Jul. 25, 2017, and Chinese Patent Application No. 201720903098.0 filed with the CNIPA on Jul. 25, 2017, the disclosures of which are hereby incorporated by reference in their entireties.

TECHNICAL FIELD

The present disclosure relates to an optical imaging lens assembly, and specifically to an optical imaging lens assembly including five lenses.

BACKGROUND

As the science and technology develops, portable electronic products are gradually arising, and portable electronic products having camera functions are more and more popular. Therefore, market demands for camera lens assemblies suitable for the portable electronic products are gradually increasing. As the portable electronic products tend to be miniaturized, the total length of the lens assembly is limited, thereby increasing the difficulty in designing the lens assembly.

Meanwhile, with the improvement of performance and the reduction in size of a common photosensitive element, such as a CCD (charge-coupled device) or a CMOS (complementary metal-oxide semiconductor) element, the number of pixels of the photosensitive element are increased and the sizes of the pixels are decreased, and there are higher requirements on high image quality and miniaturization of the optical imaging lens assembly used in combination with the photosensitive element.

The reduction in the pixel size means that the amount of light passing through the lens assembly may be smaller during the same exposure time. However, the lens assembly needs to have a larger amount of light passing through to guarantee the image quality in a dark environment (e.g., cloudy and rainy days, at dusk, etc.) The F-number (the total effective focal length of the lens assembly divided by the entrance pupil diameter of the lens assembly) typically configured for the existing lens assembly is 2.0 or more. Although this kind of lens assembly can meet the requirement of miniaturization, it cannot guarantee the image quality of the lens assembly under insufficient lighting, thus the lens assembly with the F-number of 2.0 or more is unable to meet the higher imaging requirements.

SUMMARY

The present disclosure provides an optical imaging lens assembly that may be applied to portable electronic products and may at least solve or partially solve the above-mentioned at least one of the problems in the existing technology.

According to an aspect, the present disclosure provides an optical imaging lens assembly. The optical imaging lens assembly includes, sequentially from an object side to an image side along an optical axis, a first lens, a second lens, a third lens, a fourth lens and a fifth lens. The first lens may have a positive refractive power, an object-side surface of the first lens may be a convex surface, and an image-side surface of the first lens may be a concave surface. The second lens has a positive refractive power or a negative refractive power. The third lens may have a negative refractive power. The fourth lens may have a positive refractive power. The fifth lens may have a negative refractive power, and an image-side surface of the fifth lens may be a convex surface. A total effective focal length f of the optical imaging lens assembly and an entrance pupil diameter EPD of the optical imaging lens assembly may satisfy: $f/EPD \leq 1.9$.

In an embodiment, a combined refractive power of the first lens and the second lens is a positive refractive power, and a combined focal length f12 of the first lens and the second lens and the total effective focal length f of the optical imaging lens assembly may satisfy: $0.8 < f/f12 < 1.2$.

In an embodiment, the total effective focal length f of the optical imaging lens assembly and an effective focal length f2 of the second lens may satisfy: $f/|f2| \leq 0.1$.

In an embodiment, the total effective focal length f of the optical imaging lens assembly and an effective focal length f4 of the fourth lens may satisfy: $1.3 \leq f/f4 \leq 1.6$.

In an embodiment, the total effective focal length f of the optical imaging lens assembly and an effective focal length f5 of the fifth lens may satisfy: $-1.8 \leq f/f5 \leq -1.5$.

In an embodiment, a radius of curvature R2 of the image-side surface of the first lens and a radius of curvature R6 of an image-side surface of the third lens may satisfy: $|R2/R6| \leq 0.1$.

In an embodiment, the radius of curvature R6 of the image-side surface of the third lens and a radius of curvature R7 of an object-side surface of the fourth lens may satisfy: $0 \leq R6/R7 < 10$.

In an embodiment, a center thickness CT3 of the third lens on the optical axis and a radius of curvature R5 of an object-side surface of the third lens may satisfy: $CT3/|R5| < 0.1$.

In an embodiment, the total effective focal length f of the optical imaging lens assembly and a center thickness CT4 of the fourth lens on the optical axis may satisfy: $6 < f/CT4 < 9$.

In an embodiment, a distance TTL from a center of the object-side surface of the first lens to an image plane of the optical imaging lens assembly on the optical axis and half of a diagonal length ImgH of an effective pixel area on the image plane of the optical imaging lens assembly may satisfy: $TTL/ImgH < 1.6$.

According to another aspect, the present disclosure provides an optical imaging lens assembly. The optical imaging lens assembly includes, sequentially from an object side to an image side along an optical axis, a first lens, a second lens, a third lens, a fourth lens and a fifth lens. At least one of the first lens and the fourth lens may have a positive refractive power. At least one of the third lens and the fifth lens may have a negative refractive power. The second lens has a positive refractive power or a negative refractive power, and an effective focal length f2 of the second lens and a total effective focal length f of the optical imaging lens assembly may satisfy: $f/|f2| \leq 0.1$. A combined refractive power of the first lens and the second lens may be a positive refractive power, and a combined focal length f12 of the first lens and the second lens and the total effective focal length f of the optical imaging lens assembly may satisfy: $0.8 < f/f12 < 1.2$.

In an embodiment, an object-side surface of the first lens may be a convex surface, and an image-side surface of the first lens may be a concave surface.

In an embodiment, an image-side surface of the fifth lens may be a convex surface.

In an embodiment, each of the first lens and the fourth lens has a positive refractive power.

In an embodiment, the total effective focal length f of the optical imaging lens assembly and an effective focal length f4 of the fourth lens may satisfy: $1.3 \leq f/f4 \leq 1.6$.

In an embodiment, each of the third lens and the fifth lens has a negative refractive power.

In an embodiment, the total effective focal length f of the optical imaging lens assembly and an effective focal length f5 of the fifth lens may satisfy: $-1.8 \leq f/f5 \leq -1.5$.

In an embodiment, the total effective focal length f of the optical imaging lens assembly and a center thickness CT4 of the fourth lens on the optical axis may satisfy: $6 < f/CT4 < 9$.

In an embodiment, a center thickness CT3 of the third lens on the optical axis and a radius of curvature R5 of an object-side surface of the third lens may satisfy: $CT3/|R5| < 0.1$.

In an embodiment, a radius of curvature R2 of the image-side surface of the first lens and a radius of curvature R6 of an image-side surface of the third lens may satisfy: $|R2/R6| \leq 0.1$.

In an embodiment, a radius of curvature R6 of an image-side surface of the third lens and a radius of curvature R7 of an object-side surface of the fourth lens may satisfy: $0 \leq R6/R7 < 10$.

In an embodiment, a distance TTL from a center of the object-side surface of the first lens to an image plane of the optical imaging lens assembly on the optical axis and half of a diagonal length ImgH of an effective pixel area on the image plane of the optical imaging lens assembly may satisfy: $TTL/ImgH < 1.6$.

In an embodiment, the total effective focal length f of the optical imaging lens assembly and an entrance pupil diameter EPD of the optical imaging lens assembly may satisfy: $f/EPD \leq 1.9$.

According to another aspect, the present disclosure provides an optical imaging lens assembly. The optical imaging lens assembly includes, sequentially from an object side to an image side along an optical axis, a first lens, a second lens, a third lens, a fourth lens and a fifth lens. The first lens may have a positive refractive power, an object-side surface of the first lens may be a convex surface, and an image-side surface of the first lens may be a concave surface. The second lens has a positive refractive power or a negative refractive power. The third lens may have a negative refractive power. The fourth lens may have a positive refractive power. The fifth lens may have a negative refractive power, and an image-side surface of the fifth lens may be a convex surface. A total effective focal length f of the optical imaging lens assembly and an effective focal length f4 of the fourth lens may satisfy: $1.3 \leq f/f4 \leq 1.6$.

According to another aspect, the present disclosure provides an optical imaging lens assembly. The optical imaging lens assembly includes, sequentially from an object side to an image side along an optical axis, a first lens, a second lens, a third lens, a fourth lens and a fifth lens. The first lens may have a positive refractive power, an object-side surface of the first lens may be a convex surface, and an image-side surface of the first lens may be a concave surface. The second lens has a positive refractive power or a negative refractive power. The third lens may have a negative refractive power. The fourth lens may have a positive refractive power. The fifth lens may have a negative refractive power, and an image-side surface of the fifth lens may be a convex surface. A radius of curvature R2 of the image-side surface of the first lens and a radius of curvature R6 of an image-side surface of the third lens may satisfy: $|R2/R6| \leq 0.1$.

The present disclosure uses a plurality of (for example, five) lenses. By reasonably arranging the refractive power, surface type of each lens, the center thickness of each lens and the axial spacing between lenses, in the process of increasing the amount of light passing through, the system has a large aperture advantage, thereby improving an edge light aberration while enhancing an imaging effect in a dark environment. At the same time, the optical imaging lens assembly configured as described above may have at least one of the beneficial effects of ultrathin, miniaturization, large aperture, low sensitivity, small distortion, or high image quality.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings:

FIGS. 6A-6D respectively illustrate a longitudinal aberration curve, an astigmatic curve, a distortion curve and a relative illumination curve of the optical imaging lens assembly according to Embodiment 3;

FIG. 7 illustrates a schematic structural diagram of an optical imaging lens assembly according to Embodiment 4 of the present disclosure;

FIG. 9 illustrates a schematic structural diagram of an optical imaging lens assembly according to Embodiment 5 of the present disclosure;

FIGS. 10A-10D respectively illustrate a longitudinal aberration curve, an astigmatic curve, a distortion curve and a relative illumination curve of the optical imaging lens assembly according to Embodiment 5;

DETAILED DESCRIPTION OF EMBODIMENTS

Figure 1:
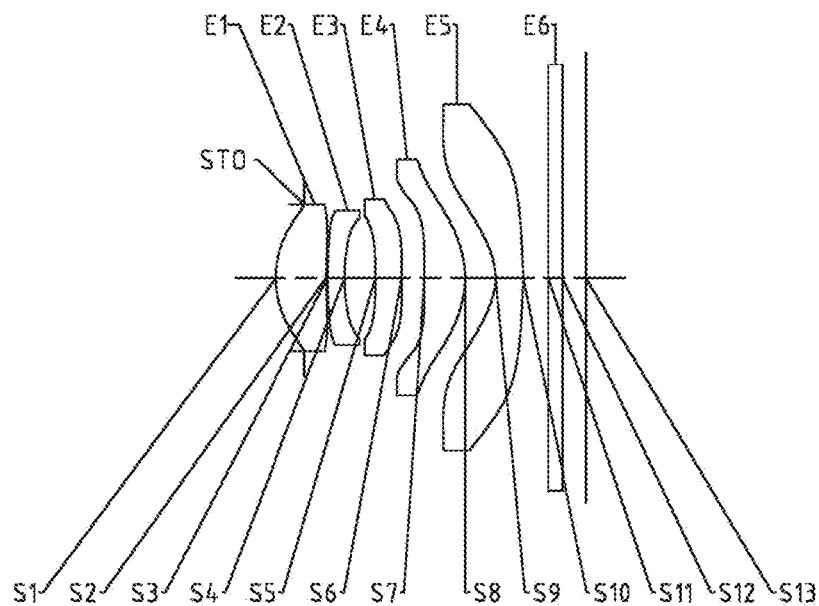
FIG. 1 illustrates a schematic structural diagram of an optical imaging lens assembly according to Embodiment 1 of the present disclosure.

For a better understanding of the present disclosure, various aspects of the present disclosure will be described in more detail with reference to the accompanying drawings. It should be understood that the detailed description is merely illustrative of exemplary implementations of the present disclosure and is not intended to limit the scope of the present disclosure in any way. Throughout the specification, the same reference numerals refer to the same elements. The expression "and/or" includes any and all combinations of one or more of the associated listed items.

It should be noted that in the specification, the expressions, such as "the first," "the second" and "the third" are only used to distinguish one feature from another, rather than represent any limitations to the feature. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In this text, the paraxial area refers to an area near the optical axis. If the lens surface is convex and the position of the convex surface is not defined, it indicates that the lens surface is convex at least in the paraxial area; if the lens surface is concave and the position of the concave surface is not defined, it indicates that the lens surface is concave at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in this specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing the implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure will be described below in detail.

An optical imaging lens assembly according to exemplary embodiments of the present disclosure includes, for example, five lenses having refractive powers, i.e., a first lens, a second lens, a third lens, a fourth lens, and a fifth lens. The optical imaging lens assembly may further include a photosensitive element disposed on the image plane.

The first lens may have a positive refractive power, an object-side surface of the first lens may be a convex surface, and an image-side surface of the first lens may be a concave surface.

The second lens may have a positive refractive power or a negative refractive power, an object-side surface of the second lens may be a convex surface, and an image-side surface of the second lens may be a concave surface.

The third lens may have a negative refractive power, and an object-side surface of the third lens may be a concave surface.

The fourth lens may have a positive refractive power, and an image-side surface of the fourth lens may be a convex surface.

The fifth lens may have a negative refractive power, an object-side surface of the fifth lens may be a concave surface, and an image-side surface of the fifth lens may be a convex surface.

A total effective focal length f of the optical imaging lens assembly and an entrance pupil diameter EPD of the optical imaging lens assembly may satisfy: $f/EPD \leq 1.9$, more specifically, f and EPD may further satisfy: $1.79 \leq f/EPD \leq 1.88$. The smaller the Fno (i.e., the total effective focal length f of the lens assembly divided by the entrance pupil diameter EPD of the lens assembly) of the optical imaging lens assembly, the larger the clear aperture of the lens assembly and the greater the amount of light passing through the lens assembly in the same unit of time. The reduction of the Fno may effectively increase the brightness of the image plane, so that the lens assembly can better meet the shooting requirements under insufficient lighting. Satisfying the conditional expression of $f/EPD \leq 1.9$ may make the lens assembly have an advantage of large aperture in the process of increasing the amount of light passing through, thereby improving the imaging effect in a dark environment while improving an edge light aberration. In addition, satisfying the above configuration is also advantageous for improving an advanced coma aberration and an astigmatism, improving the image quality of the lens assembly, and reducing the tolerance sensitivity of the lens assembly.

The total effective focal length f of the optical imaging lens assembly and an effective focal length f2 of the second lens may satisfy: $f/|f2| \leq 0.1$, more specifically, f and f2 may further satisfy: $0.01 \leq f/|f2| \leq 0.09$. By controlling the refractive power of the second lens within a certain positive and negative range, it is advantageous to improve a spherical aberration and control a chromatic aberration.

Alternatively, a combined refractive power of the first lens and the second lens is a positive refractive power. The total effective focal length f of the optical imaging lens assembly and a combined focal length f12 of the first lens and the second lens may satisfy: $0.8<f/f12<1.2$, more specifically, f and f12 may further satisfy: $0.94 \le f/f12 \le 1.01$. By controlling the combined refractive power of the first lens and the second lens, the total refractive power of the lens assembly is controlled.

The total effective focal length f of the optical imaging lens assembly and an effective focal length f4 of the fourth lens may satisfy: $1.3 \le f/f4 \le 1.6$, more specifically, f and f4 may further satisfy: $1.38 \le f/f4 \le 1.55$. By controlling the refractive power of the fourth lens within a reasonable range, aberrations related to the field-of-view such as field curvature and distortion can be effectively controlled, so that the lens assembly has a good image quality.

The total effective focal length f of the optical imaging lens assembly and an effective focal length f5 of the fifth lens may satisfy: $-1.8 \le f/f5 \le -1.5$, more specifically, f and f5 may further satisfy: $-1.77 \le f/f5 \le -1.64$. By controlling the refractive power of the fifth lens within a reasonable range, the distortion of the system can be effectively controlled and the image quality can be improved.

A radius of curvature R2 of the image-side surface of the first lens and a radius of curvature R6 of an image-side surface of the third lens may satisfy: $|R2/R6| \le 0.1$, more specifically, R2 and R6 may further satisfy: $0.01 \le |R2/R6| \le 0.07$. By controlling the bending direction and the bending degree of the image-side surface of the first lens and the image-side surface of the third lens, the direction of light is controlled to achieve the purpose of correcting the field curvature of the system.

The radius of curvature R6 of the image-side surface of the third lens and a radius of curvature R7 of an object-side surface of the fourth lens may satisfy: $0 \le R6/R7 < 10$, more specifically, R6 and R7 may further satisfy: $0 \le R6/R7 \le 9.62$. By controlling the bending direction and the bending degree of the image-side surface of the third lens and the object-side surface of the fourth lens, the direction of the edge light is controlled to achieve the purpose of enhancing an edge relative illumination.

A center thickness CT3 of the third lens on the optical axis and a radius of curvature R5 of the object-side surface of the third lens may satisfy: $CT3/|R5|<0.1$, more specifically, CT3 and R5 may further satisfy: $0.02 \le CT3/|R5| \le 0.03$, so that the third lens has a better workability.

The total effective focal length f of the optical imaging lens assembly and a center thickness CT4 of the fourth lens on the optical axis may satisfy: $6<f/CT4<9$, more specifically, f and CT4 may further satisfy: $6.75 \le f/CT4 \le 8.23$. By controlling the ratio of the total effective focal length of the lens assembly to the center thickness of the fourth lens within a certain range, a system chromatic aberration may be effectively corrected and the distortion and a coma aberration in the tangential direction may be improved. At the same time, satisfying the conditional expression of $6<f/CT4<9$ is also advantageous for molding.

A total track length TTL (i.e., a distance from a center of the object-side surface of the first lens to the image plane of the optical imaging lens assembly on the optical axis) of the optical imaging lens assembly and half of a diagonal length ImgH of an effective pixel area on the image plane of the optical imaging lens assembly may satisfy: $TTL/ImgH \le 1.6$, more specifically, TTL and ImgH may further satisfy: $1.38 \le TTL/ImgH \le 1.50$. Satisfying the conditional expression of $TTL/ImgH<1.6$ may effectively compress the total track length of the lens assembly while ensuring that the lens assembly has a large imaging area, to realize the ultra-thin characteristic and miniaturization of the lens assembly, so that the imaging lens assembly can be suitably applied to a size-limited system such as a portable electronic product.

In exemplary embodiments, the optical imaging lens assembly may also be provided with at least one diaphragm. The diaphragm may be disposed at any position between the object side and the image side as required. For example, the diaphragm may be disposed between the object side and the first lens to further improve the image quality of the lens assembly.

Alternatively, the optical imaging lens assembly described above may further include an optical filter for correcting a color deviation and/or for protecting a cover glass of the photosensitive element on the image plane.

The optical imaging lens assembly according to the above implementations of the present disclosure may use a plurality of lenses, for example, five lenses as described above. By reasonably distributing the refractive powers and the surface types of the lenses, the center thicknesses of the lenses and the axial spacings between the lenses, etc., it is possible to guarantee the miniaturization of the lens assembly, while reducing the sensitivity of the lens assembly and improving the workability of the lens assembly, thus making the optical imaging lens assembly more conductive to the production and processing and applicable to the portable electronic products. Meanwhile, the optical imaging lens assembly with the above configuration also has advantageous effects such as ultra-thin, large aperture, small distortion, and high image quality.

In the implementations of the present disclosure, at least one of the mirror surfaces of the lenses is an aspheric mirror surface. The aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has advantages of improving a distortion aberration and an astigmatic aberration. The use of the aspheric lens can eliminate as much as possible the aberrations that occur during the imaging, thereby improving the image quality.

However, it should be understood by those skilled in the art that the various results and advantages described in the present specification may be obtained by changing the number of the lenses forming the optical imaging lens assembly without departing from the technical solution claimed by the present disclosure. For example, although five lenses are described as an example in the implementations, the optical imaging lens assembly is not limited to include five lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 illustrates a schematic structural diagram of the optical imaging lens assembly according to Embodiment 1 of the present disclosure.

As shown in FIG. 1, the optical imaging lens assembly includes a first lens E1, a second lens E2, a third lens E3, a fourth lens E4, a fifth lens E5, and an image plane S13 sequentially from an object side to an image side along an optical axis. The optical imaging lens assembly may further include a photosensitive element disposed on the image plane S13.

The first lens E1 has a positive refractive power, an object-side surface S1 of the first lens E1 is a convex surface, and an image-side surface S2 of the first lens E1 is a concave surface. Both the object-side surface S1 and the image-side surface S2 of the first lens E1 are aspheric surfaces.

The second lens E2 has a negative refractive power, an object-side surface S3 of the second lens E2 is a convex surface, and an image-side surface S4 of the second lens E2 is a concave surface. Both the object-side surface S3 and the image-side surface S4 of the second lens E2 are aspheric surfaces.

The third lens E3 has a negative refractive power, an object-side surface S5 of the third lens E3 is a concave surface, and an image-side surface S6 of the third lens E3 is a concave surface. Both the object-side surface S5 and the image-side surface S6 of the third lens E3 are aspheric surfaces.

The fourth lens E4 has a positive refractive power, an object-side surface S7 of the fourth lens E4 is a convex surface, and an image-side surface S8 of the fourth lens E4 is a convex surface. Both the object-side surface S7 and the image-side surface S8 of the fourth lens E4 are aspheric surfaces.

The fifth lens E5 has a negative refractive power, an object-side surface S9 of the fifth lens E5 is a concave surface, and an image-side surface S10 of the fifth lens E5 is a convex surface. Both the object-side surface S9 and the image-side surface S10 of the fifth lens E5 are aspheric surfaces.

Alternatively, the optical imaging lens assembly may further include an optical filter E6 having an object-side surface S11 and an image-side surface S12. Light from an object sequentially passes through the surfaces S1-S12 and finally forms an image on the image plane S13.

Alternatively, the optical imaging lens assembly may further include a diaphragm STO disposed between the object side and the first lens E1, to improve the image quality.

Table 1 shows the surface type, the radius of curvature, the thickness, the material and the conic coefficient of each lens of the optical imaging lens assembly in Embodiment 1. The radius of curvature and the thickness are shown in millimeters (mm).

TABLE 1

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.4133 | | | |
| S1 | aspheric | 1.4078 | 0.7267 | 1.55 | 56.1 | −0.4013 |
| S2 | aspheric | 3.0623 | 0.0225 | | | −83.3313 |
| S3 | aspheric | 3.3394 | 0.2460 | 1.67 | 20.4 | −53.0287 |
| S4 | aspheric | 3.0655 | 0.4458 | | | 10.6304 |
| S5 | aspheric | −14.2933 | 0.3817 | 1.55 | 56.1 | −81.4025 |
| S6 | aspheric | 136.2869 | 0.3263 | | | −99.0000 |
| S7 | aspheric | 82.2185 | 0.5890 | 1.55 | 56.1 | 93.6549 |
| S8 | aspheric | −1.4193 | 0.4420 | | | −1.3386 |
| S9 | aspheric | −0.8673 | 0.4000 | 1.54 | 55.9 | −3.6992 |
| S10 | aspheric | −3.5738 | 0.3618 | | | −85.1429 |
| S11 | spherical | infinite | 0.2100 | 1.52 | 64.2 | |
| S12 | spherical | infinite | 0.3432 | | | |
| S13 | spherical | infinite | | | | |

The radius of curvature R2 of the image-side surface S2 of the first lens E1 and the radius of curvature R6 of the image-side surface S6 of the third lens E3 satisfy: |R2/R6|=0.02. The radius of curvature R6 of the image-side surface S6 of the third lens E3 and the radius of curvature R7 of the object-side surface S7 of the fourth lens E4 satisfy: R6/R7=1.66. The center thickness CT3 of the third lens E3 on the optical axis and the radius of curvature R5 of the object-side surface S5 of the third lens E3 satisfy: CT3/|R5|=0.03.

In this embodiment, five lenses are used as an example. By reasonably distributing the focal length and the surface type of each lens, the center thickness of each lens and the spacing distances between the lenses, the amount of light passing through the lens assembly can be increased and the image quality of the lens assembly can be improved, while achieving miniaturization of the lens assembly. The surface type x of each aspheric surface is defined by the following formula:

$$x = \frac{ch^2}{1+\sqrt{1-(k+1)c^2h^2}} + \sum A_i h^i \qquad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$, $A_{18}$ and $A_{20}$ applicable to the aspheric mirror surfaces S1-S8 in Embodiment 1.

TABLE 2

| surface number | A4 | A6 | A8 | A10 | A12 |
|---|---|---|---|---|---|
| S1 | −7.1221E−03 | 1.8514E−01 | −1.0274E+00 | 3.4293E+00 | −7.1232E+00 |
| S2 | −2.2052E−01 | −7.2588E−01 | 7.1457E+00 | −2.4522E+01 | 4.8722E+01 |
| S3 | −3.0435E−01 | −3.3585E−03 | 5.3007E+00 | −2.1912E+01 | 4.8611E+01 |
| S4 | −6.0497E−02 | 1.6332E−01 | 4.6823E−02 | 3.3556E+00 | −2.5384E+01 |
| S5 | −1.5982E−01 | −4.5582E−01 | 4.4375E+00 | −2.3628E+01 | 7.4667E+01 |
| S6 | −1.8505E−01 | −1.8437E−03 | 2.1344E−01 | −7.1044E−01 | 8.3569E−01 |
| S7 | −8.9827E−02 | −6.1408E−02 | 1.5784E−01 | −3.5433E−01 | 4.4453E−01 |
| S8 | 7.0162E−02 | −2.1532E−01 | 4.2455E−01 | −5.4701E−01 | 4.4021E−01 |
| S9 | −3.6513E−02 | −7.3053E−02 | 1.3250E−01 | −8.5837E−02 | 3.1449E−02 |
| S10 | 9.0482E−02 | −1.5381E−01 | 1.2409E−01 | −6.3979E−02 | 2.1638E−02 |

| surface number | A14 | A16 | A18 | A20 |
|---|---|---|---|---|
| S1 | 9.1575E+00 | −7.1153E+00 | 3.0402E+00 | −5.4780E−01 |
| S2 | −6.0875E+01 | 4.7092E+01 | −2.0586E+01 | 3.8826E+00 |
| S3 | −6.6542E+01 | 5.6036E+01 | −2.6541E+01 | 5.4027E+00 |
| S4 | 7.7305E+01 | −1.2184E+02 | 9.8804E+01 | −3.2678E+01 |
| S5 | −1.4578E+02 | 1.7235E+02 | −1.1329E+02 | 3.1885E+01 |
| S6 | −1.4990E−01 | −5.5576E−01 | 5.0415E−01 | −1.3195E−01 |
| S7 | −3.7713E−01 | 2.1282E−01 | −6.6180E−02 | 8.2856E−03 |
| S8 | −2.1118E−01 | 5.8458E−02 | −8.5959E−03 | 5.1749E−04 |
| S9 | −7.1056E−03 | 9.7946E−04 | −7.5472E−05 | 2.4906E−06 |
| S10 | −4.7940E−03 | 6.6913E−04 | −5.3092E−05 | 1.8155E−06 |

Table 3 shows the effective focal lengths f1-f5 of the lenses, the total effective focal length f of the optical imaging lens assembly, and the total track length TTL (i.e., the distance from the center of the object-side surface S1 of the first lens E1 to the image plane S13 on the optical axis) of the optical imaging lens assembly in Embodiment 1.

TABLE 3

| parameter | | | | | | |
|---|---|---|---|---|---|---|
| f1 (mm) | f2 (mm) | f3 (mm) | f4 (mm) | f5 (mm) | f (mm) | TTL (mm) |
| value 4.13 | −87.58 | −23.67 | 2.56 | −2.25 | 3.98 | 4.50 |

The total effective focal length f of the optical imaging lens assembly and the effective focal length f2 of the second lens E2 satisfy: f/|f2|=0.05. The total effective focal length f of the optical imaging lens assembly and the effective focal length f4 of the fourth lens E4 satisfy: f/f4=1.55. The total effective focal length f of the optical imaging lens assembly and the effective focal length f5 of the fifth lens E5 satisfy: f/f5=−1.77. The total effective focal length f of the optical imaging lens assembly and the center thickness CT4 of the fourth lens E4 on the optical axis satisfy: f/CT4=6.75.

In Embodiment 1, the total effective focal length f of the optical imaging lens assembly and the entrance pupil diameter EPD of the optical imaging lens assembly satisfy: f/EPD=1.88. The total effective focal length f of the optical imaging lens assembly and the combined focal length f12 of the first lens and the second lens satisfy: f/f12=0.96. The total track length TTL of the optical imaging lens assembly and the half of the diagonal length ImgH of the effective pixel area on the image plane of the optical imaging lens assembly satisfy: TTL/ImgH=1.38.

Figures 2A, 2B:
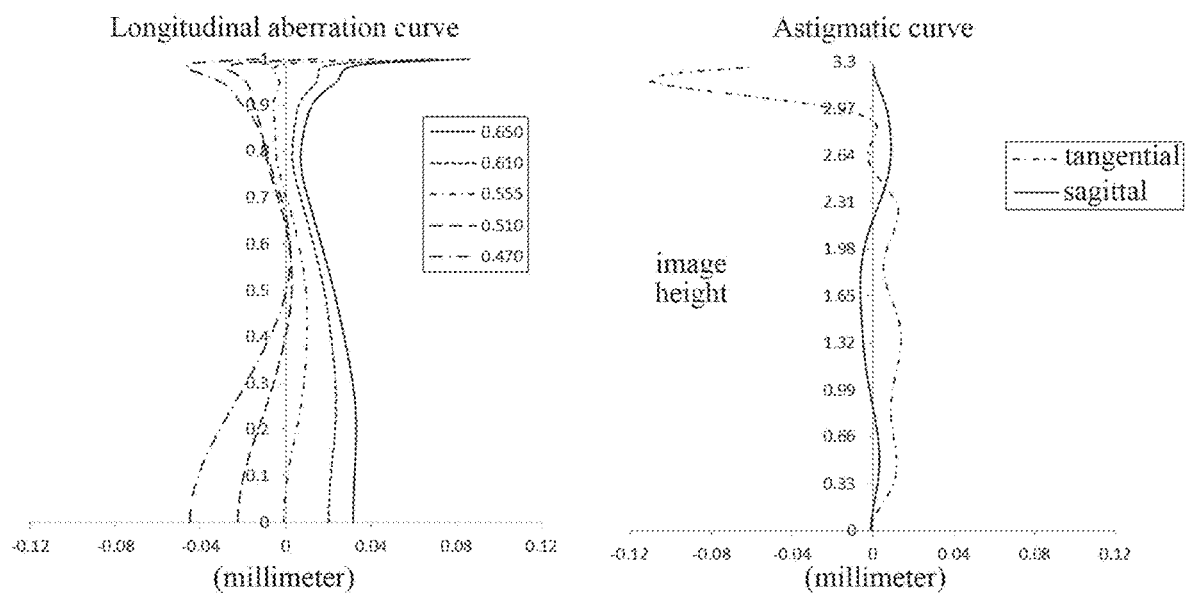
FIGS. 2A-2D respectively illustrate a longitudinal aberration curve, an astigmatic curve, a distortion curve and a relative illumination curve of the optical imaging lens assembly according to Embodiment 1.
Figures 2C, 2D:
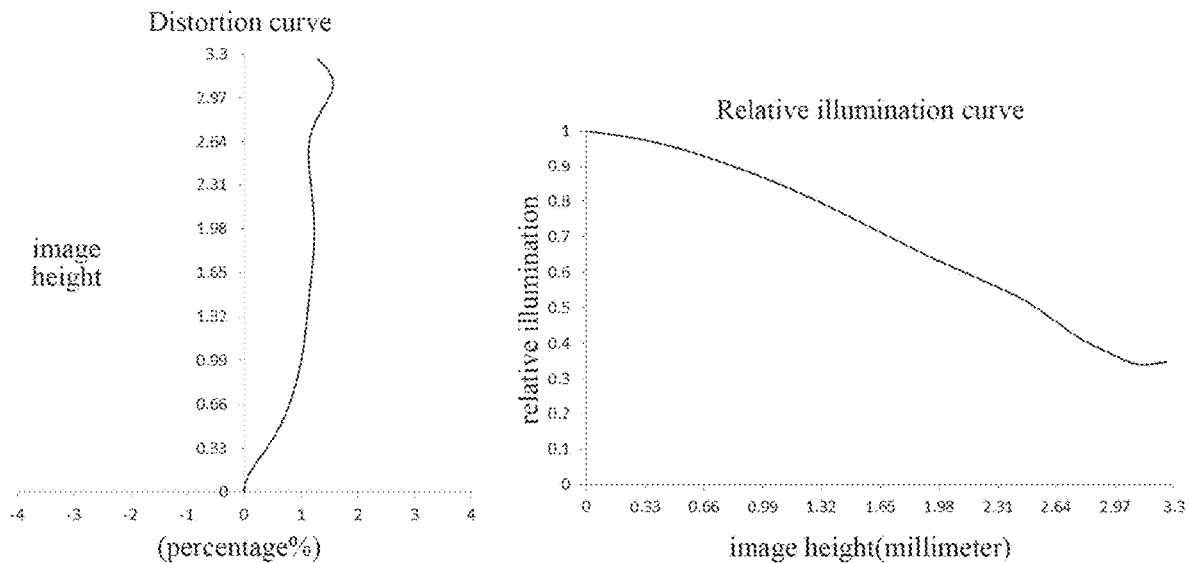

FIG. 2A shows a longitudinal aberration curve of the optical imaging lens assembly according to Embodiment 1, representing deviations of converged focal points of light of different wavelengths after passing through the lens assembly. FIG. 2B shows an astigmatic curve of the optical imaging lens assembly according to Embodiment 1, representing a curvature of a tangential image plane and a curvature of a sagittal image plane. FIG. 2C shows a distortion curve of the optical imaging lens assembly according to Embodiment 1, representing amounts of distortion at different viewing angles. FIG. 2D shows a relative illumination curve of the optical imaging lens assembly according to Embodiment 1, representing relative illuminations corresponding to different image heights on the image plane. According to FIG. 2A to FIG. 2D, it may be seen that the optical imaging lens assembly according to Embodiment 1 can achieve a good image quality.

Embodiment 2

Figure 3:
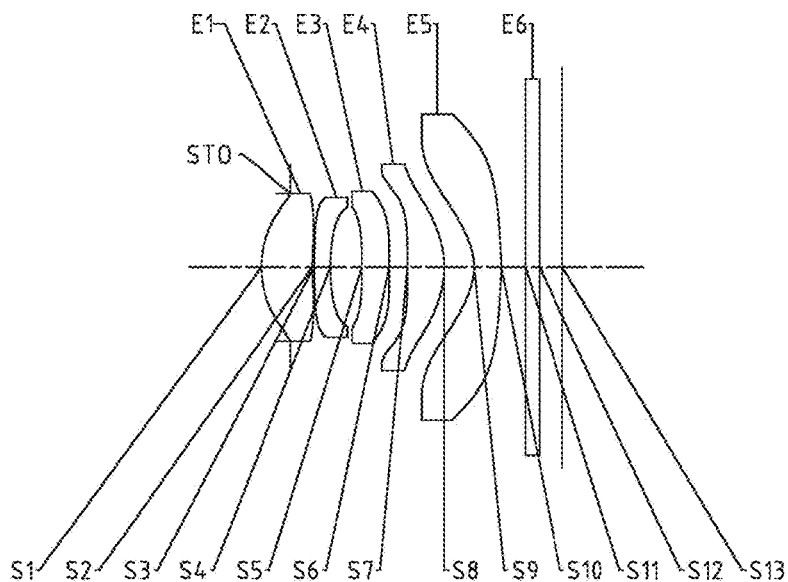
FIG. 3 illustrates a schematic structural diagram of an optical imaging lens assembly according to Embodiment 2 of the present disclosure.

An optical imaging lens assembly according to Embodiment 2 of the present disclosure is described below with reference to FIGS. 3-4D. For the purpose of brevity, the description of parts similar to those in Embodiment 1 will be omitted. FIG. 3 illustrates a schematic structural diagram of the optical imaging lens assembly according to Embodiment 2 of the present disclosure.

As shown in FIG. 3, the optical imaging lens assembly includes a first lens E1, a second lens E2, a third lens E3, a fourth lens E4, a fifth lens E5, and an image plane S13 sequentially from an object side to an image side along an optical axis. The optical imaging lens assembly may further include a photosensitive element disposed on the image plane S13.

The first lens E1 has a positive refractive power, an object-side surface S1 of the first lens E1 is a convex surface, and an image-side surface S2 of the first lens E1 is a concave surface. Both the object-side surface S1 and the image-side surface S2 of the first lens E1 are aspheric surfaces.

The second lens E2 has a negative refractive power, an object-side surface S3 of the second lens E2 is a convex surface, and an image-side surface S4 of the second lens E2 is a concave surface. Both the object-side surface S3 and the image-side surface S4 of the second lens E2 are aspheric surfaces.

The third lens E3 has a negative refractive power, an object-side surface S5 of the third lens E3 is a concave surface, and an image-side surface S6 of the third lens E3 is a concave surface. Both the object-side surface S5 and the image-side surface S6 of the third lens E3 are aspheric surfaces.

The fourth lens E4 has a positive refractive power, an object-side surface S7 of the fourth lens E4 is a convex surface, and an image-side surface S8 of the fourth lens E4 is a convex surface. Both the object-side surface S7 and the image-side surface S8 of the fourth lens E4 are aspheric surfaces.

The fifth lens E5 has a negative refractive power, an object-side surface S9 of the fifth lens E5 is a concave surface, and an image-side surface S10 of the fifth lens E5 is a convex surface. Both the object-side surface S9 and the image-side surface S10 of the fifth lens E5 are aspheric surfaces.

Alternatively, the optical imaging lens assembly may further include an optical filter E6 having an object-side surface S11 and an image-side surface S12. Light from an object sequentially passes through the surfaces S1-S12 and finally forms an image on the image plane S13.

Alternatively, the optical imaging lens assembly may further include a diaphragm STO disposed between the object side and the first lens E1, to improve the image quality.

Table 4 shows the surface type, the radius of curvature, the thickness, the material and the conic coefficient of each lens of the optical imaging lens assembly in Embodiment 2. The radius of curvature and the thickness are shown in millimeters (mm). Table 5 shows the high-order coefficients applicable to the aspheric mirror surfaces in Embodiment 2. The surface type of each aspheric surface may be defined by formula (1) given in the above Embodiment 1. Table 6 shows the effective focal lengths f1-f5 of the lenses, the total effective focal length f of the optical imaging lens assembly, and the total track length TTL of the optical imaging lens assembly in Embodiment 2.

TABLE 4

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4395 | | | |
| S1 | aspheric | 1.4368 | 0.7673 | 1.55 | 56.1 | −0.4016 |
| S2 | aspheric | 3.3992 | 0.0232 | | | −83.1604 |
| S3 | aspheric | 3.7833 | 0.2460 | 1.67 | 20.4 | −40.6524 |
| S4 | aspheric | 3.3287 | 0.4694 | | | 11.4511 |
| S5 | aspheric | −15.5051 | 0.4072 | 1.55 | 56.1 | −91.9174 |
| S6 | aspheric | 140.0782 | 0.2709 | | | −99.0000 |
| S7 | aspheric | 360.8404 | 0.5493 | 1.55 | 56.1 | −99.0000 |
| S8 | aspheric | −1.4455 | 0.4463 | | | −1.2908 |
| S9 | aspheric | −0.8520 | 0.4050 | 1.54 | 55.9 | −3.6312 |
| S10 | aspheric | −3.1301 | 0.3613 | | | −99.0000 |
| S11 | spherical | infinite | 0.2100 | 1.52 | 64.2 | |
| S12 | spherical | infinite | 0.3436 | | | |
| S13 | spherical | infinite | | | | |

TABLE 5

| surface number | A4 | A6 | A8 | A10 | A12 |
|---|---|---|---|---|---|
| S1 | −1.1411E−02 | 2.0326E−01 | −1.0375E+00 | 3.1071E+00 | −5.7675E+00 |
| S2 | −1.9165E−01 | −6.2634E−01 | 5.2365E+00 | −1.5590E+01 | 2.6410E+01 |
| S3 | −2.6231E−01 | −1.3989E−01 | 4.6309E+00 | −1.6603E+01 | 3.2291E+01 |
| S4 | −1.5736E−02 | −4.1831E−04 | 8.8383E−01 | −1.4735E+00 | −4.0921E+00 |
| S5 | −2.2074E−01 | 6.0381E−01 | −2.7381E+00 | 7.3759E+00 | −1.1392E+01 |
| S6 | −1.6636E−01 | 1.0005E−01 | −3.7505E−01 | 1.0183E+00 | −1.9285E+00 |
| S7 | −1.4424E−01 | 3.0281E−01 | −8.2422E−01 | 1.1823E+00 | −1.0304E+00 |
| S8 | 2.8596E−02 | −4.2389E−02 | 1.5050E−01 | −3.2723E−01 | 3.5441E−01 |
| S9 | −1.9734E−02 | −6.9624E−02 | 7.6728E−02 | −2.4803E−02 | 4.0853E−04 |
| S10 | 5.5663E−02 | −9.3837E−02 | 6.3208E−02 | −2.6729E−02 | 7.3297E−03 |

| surface number | A14 | A16 | A18 | A20 |
|---|---|---|---|---|
| S1 | 6.6580E+00 | −4.6736E+00 | 1.8121E+00 | −2.9627E−01 |
| S2 | −2.7676E+01 | 1.7765E+01 | −6.4041E+00 | 9.9228E−01 |
| S3 | −3.8562E+01 | 2.8267E+01 | −1.1653E+01 | 2.0674E+00 |
| S4 | 1.9130E+01 | −2.9534E+01 | 2.0791E+01 | −5.4633E+00 |
| S5 | 7.4625E+00 | 3.1220E+00 | −7.7190E+00 | 3.3734E+00 |
| S6 | 2.2883E+00 | −1.6304E+00 | 6.4024E−01 | −1.0467E−01 |
| S7 | 5.1596E−01 | −1.2497E−01 | 7.2118E−03 | 1.2982E−03 |
| S8 | −2.0305E−01 | 6.3877E−02 | −1.0496E−02 | 7.0648E−04 |
| S9 | 1.7289E−03 | −4.7246E−04 | 5.3971E−05 | −2.3801E−06 |
| S10 | −1.3175E−03 | 1.5126E−04 | −1.0111E−05 | 3.0202E−07 |

TABLE 6

| | | | parameter | | | | |
|---|---|---|---|---|---|---|---|
| | f1 (mm) | f2 (mm) | f3 (mm) | f4 (mm) | f5 (mm) | f (mm) | TTL (mm) |
| value | 4.01 | −53.11 | −25.55 | 2.64 | −2.33 | 3.98 | 4.50 |

Figure 4A:
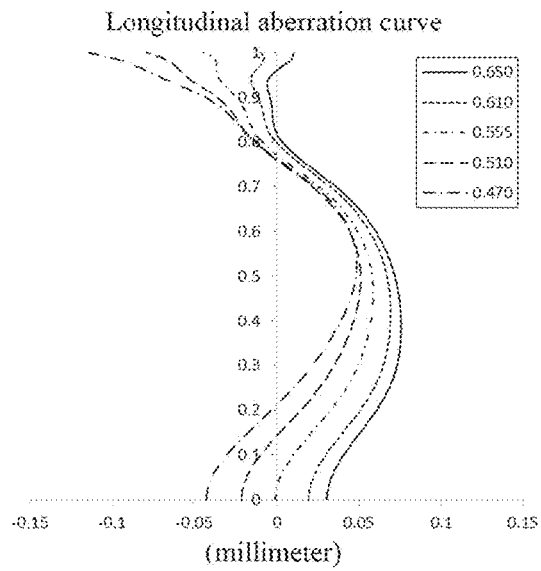
FIGS. 4A-4D respectively illustrate a longitudinal aberration curve, an astigmatic curve, a distortion curve and a relative illumination curve of the optical imaging lens assembly according to Embodiment 2.
Figure 4B:
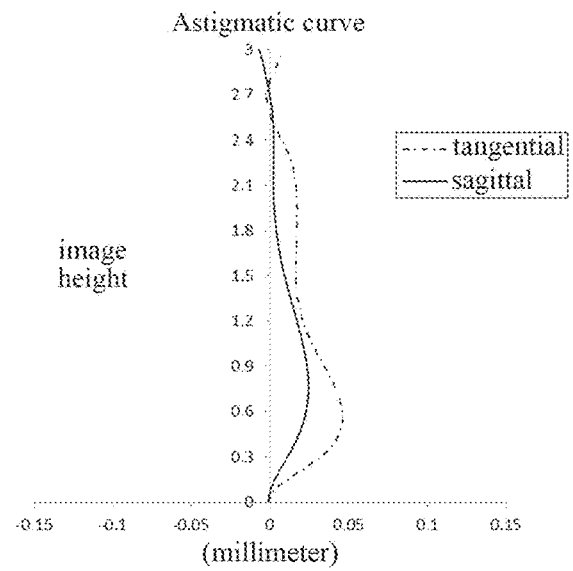
Figure 4C:
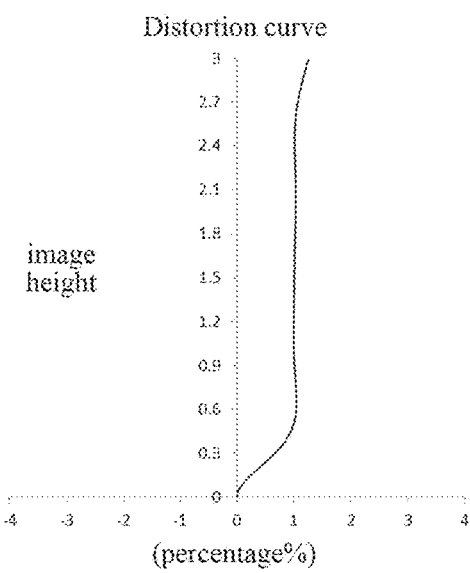
Figure 4D:
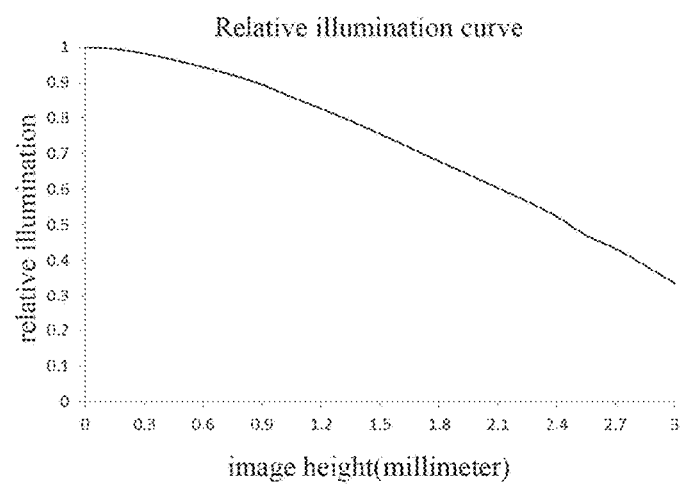

FIG. 4A shows a longitudinal aberration curve of the optical imaging lens assembly according to Embodiment 2, representing deviations of converged focal points of light of different wavelengths after passing through the lens assembly. FIG. 4B shows an astigmatic curve of the optical imaging lens assembly according to Embodiment 2, representing a curvature of a tangential image plane and a curvature of a sagittal image plane. FIG. 4C shows a distortion curve of the optical imaging lens assembly according to Embodiment 2, representing amounts of distortion at different viewing angles. FIG. 4D shows a relative illumination curve of the optical imaging lens assembly according to Embodiment 2, representing relative illuminations corresponding to different image heights on the image plane. According to FIG. 4A to FIG. 4D, it may be seen that the optical imaging lens assembly according to Embodiment 2 can achieve a good image quality.

Embodiment 3

Figure 5:
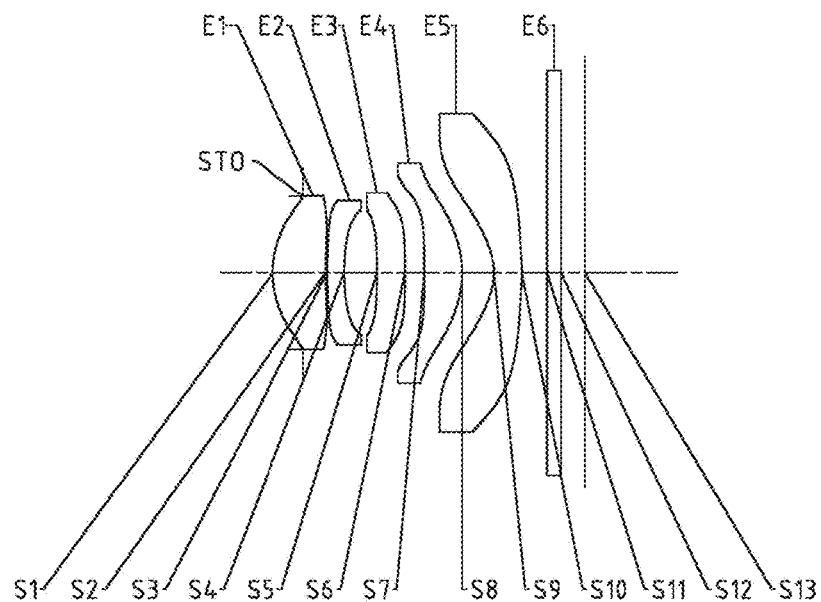
FIG. 5 illustrates a schematic structural diagram of an optical imaging lens assembly according to Embodiment 3 of the present disclosure.

An optical imaging lens assembly according to Embodiment 3 of the present disclosure is described below with reference to FIGS. 5-6D. FIG. 5 illustrates a schematic structural diagram of the optical imaging lens assembly according to Embodiment 3 of the present disclosure.

As shown in FIG. 5, the optical imaging lens assembly includes a first lens E1, a second lens E2, a third lens E3, a fourth lens E4, a fifth lens E5, and an image plane S13 sequentially from an object side to an image side along an optical axis. The optical imaging lens assembly may further include a photosensitive element disposed on the image plane S13.

The first lens E1 has a positive refractive power, an object-side surface S1 of the first lens E1 is a convex surface, and an image-side surface S2 of the first lens E1 is a concave surface. Both the object-side surface S1 and the image-side surface S2 of the first lens E1 are aspheric surfaces.

The second lens E2 has a negative refractive power, an object-side surface S3 of the second lens E2 is a convex surface, and an image-side surface S4 of the second lens E2 is a concave surface. Both the object-side surface S3 and the image-side surface S4 of the second lens E2 are aspheric surfaces.

The third lens E3 has a negative refractive power, an object-side surface S5 of the third lens E3 is a concave surface, and an image-side surface S6 of the third lens E3 is a concave surface. Both the object-side surface S5 and the image-side surface S6 of the third lens E3 are aspheric surfaces.

The fourth lens E4 has a positive refractive power, an object-side surface S7 of the fourth lens E4 is a convex surface, and an image-side surface S8 of the fourth lens E4 is a convex surface. Both the object-side surface S7 and the image-side surface S8 of the fourth lens E4 are aspheric surfaces.

The fifth lens E5 has a negative refractive power, an object-side surface S9 of the fifth lens E5 is a concave surface, and an image-side surface S10 of the fifth lens E5 is a convex surface. Both the object-side surface S9 and the image-side surface S10 of the fifth lens E5 are aspheric surfaces.

Alternatively, the optical imaging lens assembly may further include an optical filter E6 having an object-side surface S11 and an image-side surface S12. Light from an object sequentially passes through the surfaces S1-S12 and finally forms an image on the image plane S13.

Alternatively, the optical imaging lens assembly may further include a diaphragm STO disposed between the object side and the first lens E1, to improve the image quality.

Table 7 shows the surface type, the radius of curvature, the thickness, the material and the conic coefficient of each lens of the optical imaging lens assembly in Embodiment 3. The radius of curvature and the thickness are shown in millimeters (mm). Table 8 shows the high-order coefficients applicable to the aspheric mirror surfaces in Embodiment 3. The surface type of each aspheric surface may be defined by formula (1) given in the above Embodiment 1. Table 9 shows the effective focal lengths f1-f5 of the lenses, the total effective focal length f of the optical imaging lens assembly, and the total track length TTL of the optical imaging lens assembly in Embodiment 3.

TABLE 7

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.4358 | | | |
| S1 | aspheric | 1.4395 | 0.7603 | 1.55 | 56.1 | −0.3972 |
| S2 | aspheric | 3.4104 | 0.0231 | | | −86.8528 |
| S3 | aspheric | 3.7874 | 0.2460 | 1.67 | 20.4 | −44.5920 |
| S4 | aspheric | 3.3167 | 0.4721 | | | 11.2116 |
| S5 | aspheric | −15.0718 | 0.4003 | 1.55 | 56.1 | −90.2334 |
| S6 | aspheric | 221.4211 | 0.2781 | | | −99.0000 |
| S7 | aspheric | 233.3901 | 0.5461 | 1.55 | 56.1 | 99.0000 |
| S8 | aspheric | −1.4613 | 0.4579 | | | −1.2810 |
| S9 | aspheric | −0.8582 | 0.4007 | 1.54 | 55.9 | −3.7142 |
| S10 | aspheric | −3.1413 | 0.3618 | | | −99.0000 |
| S11 | spherical | infinite | 0.2100 | 1.52 | 64.2 | |
| S12 | spherical | infinite | 0.3432 | | | |
| S13 | spherical | infinite | | | | |

TABLE 8

| surface number | A4 | A6 | A8 | A10 | A12 |
|---|---|---|---|---|---|
| S1 | −1.1420E−02 | 2.0312E−01 | −1.0321E+00 | 3.0755E+00 | −5.6766E+00 |
| S2 | −1.9489E−01 | −6.2836E−01 | 5.4208E+00 | −1.6531E+01 | 2.8752E+01 |
| S3 | −2.6756E−01 | −1.1171E−01 | 4.6191E+00 | −1.6919E+01 | 3.3469E+01 |
| S4 | −2.0743E−02 | 1.8765E−02 | 7.4443E−01 | −6.9738E−01 | −6.9850E+00 |
| S5 | −2.1772E−01 | 5.1731E−01 | −2.0694E+00 | 4.4244E+00 | −3.4059E+00 |
| S6 | −1.7210E−01 | 1.4519E−01 | −6.2394E−01 | 1.7820E+00 | −3.3460E+00 |
| S7 | −1.5142E−01 | 3.4726E−01 | −9.6390E−01 | 1.4375E+00 | −1.3172E+00 |
| S8 | 2.9501E−02 | −5.3330E−02 | 1.7671E−01 | −3.5434E−01 | 3.6733E−01 |
| S9 | −1.7091E−02 | −8.5953E−02 | 1.0673E−01 | −5.0251E−02 | 1.2274E−02 |
| S10 | 5.8521E−02 | −9.6404E−02 | 6.3492E−02 | −2.5666E−02 | 6.5375E−03 |

| surface number | A14 | A16 | A18 | A20 |
|---|---|---|---|---|
| S1 | 6.5164E+00 | −4.5506E+00 | 1.7555E+00 | −2.8559E−01 |
| S2 | −3.1017E+01 | 2.0535E+01 | −7.6458E+00 | 1.2250E+00 |
| S3 | −4.0617E+01 | 3.0221E+01 | −1.2628E+01 | 2.2670E+00 |
| S4 | 2.5775E+01 | −3.8576E+01 | 2.7469E+01 | −7.5330E+00 |
| S5 | −6.0195E+00 | 1.6915E+01 | −1.5499E+01 | 5.2171E+00 |
| S6 | 3.9183E+00 | −2.7693E+00 | 1.0848E+00 | −1.7896E−01 |
| S7 | 7.1265E−01 | −2.0425E−01 | 2.4366E−02 | −2.3484E−04 |
| S8 | −2.0514E−01 | 6.3388E−02 | −1.0264E−02 | 6.8155E−04 |
| S9 | −1.5410E−03 | 6.1942E−05 | 5.8585E−06 | −5.3540E−07 |
| S10 | −1.0483E−03 | 1.0143E−04 | −5.2616E−06 | 1.0763E−07 |

TABLE 9

| | | | parameter | | | |
|---|---|---|---|---|---|---|
| | f1 (mm) | f2 (mm) | f3 (mm) | f4 (mm) | f5 (mm) | f (mm) | TTL (mm) |
| value | 4.02 | −50.66 | −25.83 | 2.66 | −2.34 | 3.98 | 4.50 |

Figures 6A, 6B:
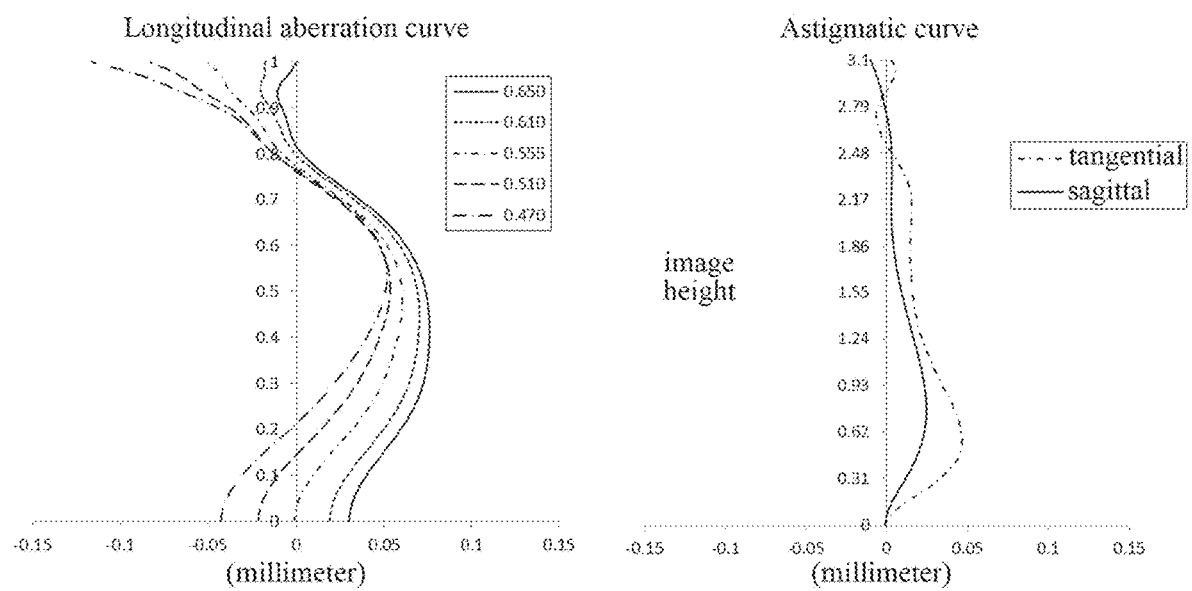

FIG. 6A shows a longitudinal aberration curve of the optical imaging lens assembly according to Embodiment 3, representing deviations of converged focal points of light of different wavelengths after passing through the lens assembly. FIG. 6B shows an astigmatic curve of the optical imaging lens assembly according to Embodiment 3, representing a curvature of a tangential image plane and a curvature of a sagittal image plane. FIG. 6C shows a distortion curve of the optical imaging lens assembly according to Embodiment 3, representing amounts of distortion at different viewing angles. FIG. 6D shows a relative illumination curve of the optical imaging lens assembly according to Embodiment 3, representing relative illuminations corresponding to different image heights on the image plane. According to FIG. 6A to FIG. 6D, it may be seen that the optical imaging lens assembly according to Embodiment 3 can achieve a good image quality.

Embodiment 4

An optical imaging lens assembly according to Embodiment 4 of the present disclosure is described below with reference to FIGS. 7-8D. FIG. 7 illustrates a schematic structural diagram of the optical imaging lens assembly according to Embodiment 4 of the present disclosure.

As shown in FIG. 7, the optical imaging lens assembly includes a first lens E1, a second lens E2, a third lens E3, a fourth lens E4, a fifth lens E5, and an image plane S13 sequentially from an object side to an image side along an optical axis. The optical imaging lens assembly may further include a photosensitive element disposed on the image plane S13.

The first lens E1 has a positive refractive power, an object-side surface S1 of the first lens E1 is a convex surface, and an image-side surface S2 of the first lens E1 is a concave surface. Both the object-side surface S1 and the image-side surface S2 of the first lens E1 are aspheric surfaces.

The second lens E2 has a negative refractive power, an object-side surface S3 of the second lens E2 is a convex surface, and an image-side surface S4 of the second lens E2 is a concave surface. Both the object-side surface S3 and the image-side surface S4 of the second lens E2 are aspheric surfaces.

The third lens E3 has a negative refractive power, an object-side surface S5 of the third lens E3 is a concave surface, and an image-side surface S6 of the third lens E3 is a convex surface. Both the object-side surface S5 and the image-side surface S6 of the third lens E3 are aspheric surfaces.

The fourth lens E4 has a positive refractive power, an object-side surface S7 of the fourth lens E4 is a plane surface, and an image-side surface S8 of the fourth lens E4 is a convex surface. Both the object-side surface S7 and the image-side surface S8 of the fourth lens E4 are aspheric surfaces.

The fifth lens E5 has a negative refractive power, an object-side surface S9 of the fifth lens E5 is a concave surface, and an image-side surface S10 of the fifth lens E5 is a convex surface. Both the object-side surface S9 and the image-side surface S10 of the fifth lens E5 are aspheric surfaces.

Alternatively, the optical imaging lens assembly may further include an optical filter E6 having an object-side surface S11 and an image-side surface S12. Light from an object sequentially passes through the surfaces S1-S12 and finally forms an image on the image plane S13.

Alternatively, the optical imaging lens assembly may further include a diaphragm STO disposed between the object side and the first lens E1, to improve the image quality.

Table 10 shows the surface type, the radius of curvature, the thickness, the material and the conic coefficient of each lens of the optical imaging lens assembly in Embodiment 4.

The radius of curvature and the thickness are shown in millimeters (mm). Table 11 shows the high-order coefficients applicable to the aspheric mirror surfaces in Embodiment 4. The surface type of each aspheric surface may be defined by formula (1) given in the above Embodiment 1. Table 12 shows the effective focal lengths f1-f5 of the lenses, the total effective focal length f of the optical imaging lens assembly, and the total track length TTL of the optical imaging lens assembly in Embodiment 4.

TABLE 10

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4268 | | | |
| S1 | aspheric | 1.4335 | 0.7452 | 1.55 | 56.1 | −0.3922 |
| S2 | aspheric | 3.3879 | 0.0231 | | | −90.1268 |
| S3 | aspheric | 3.7257 | 0.2460 | 1.67 | 20.4 | −48.6402 |
| S4 | aspheric | 3.2335 | 0.4609 | | | 10.9117 |
| S5 | aspheric | −13.0589 | 0.3994 | 1.55 | 56.1 | −99.0000 |
| S6 | aspheric | −92.9796 | 0.3001 | | | 99.0000 |
| S7 | aspheric | infinite | 0.5430 | 1.55 | 56.1 | 99.0000 |
| S8 | aspheric | −1.4620 | 0.4664 | | | −1.3180 |
| S9 | aspheric | −0.8658 | 0.4000 | 1.54 | 55.9 | −3.7632 |
| S10 | aspheric | −3.2459 | 0.3618 | | | −99.0000 |
| S11 | spherical | infinite | 0.2100 | 1.52 | 64.2 | |
| S12 | spherical | infinite | 0.3432 | | | |
| S13 | spherical | infinite | | | | |

TABLE 11

| surface number | A4 | A6 | A8 | A10 | A12 |
|---|---|---|---|---|---|
| S1 | −1.0332E−02 | 2.0390E−01 | −1.0644E+00 | 3.2667E+00 | −6.2049E+00 |
| S2 | −2.0111E−01 | −6.4361E−01 | 5.8215E+00 | −1.8436E+01 | 3.3392E+01 |
| S3 | −2.7786E−01 | −8.9037E−02 | 4.8370E+00 | −1.8361E+01 | 3.7555E+01 |
| S4 | −3.3076E−02 | 4.5750E−02 | 6.0714E−01 | 1.6881E−01 | −1.0903E+01 |
| S5 | −2.1778E−01 | 3.8704E−01 | −1.0502E+00 | −7.0188E−01 | 1.2731E+01 |
| S6 | −1.7043E−01 | 8.3952E−02 | −3.2693E−01 | 9.3641E−01 | −1.9251E+00 |
| S7 | −1.3170E−01 | 2.1472E−01 | −5.2702E−01 | 6.0964E−01 | −3.6815E−01 |
| S8 | 3.2475E−02 | −9.0158E−02 | 2.7947E−01 | −4.9636E−01 | 4.7953E−01 |
| S9 | −3.2240E−02 | −5.5232E−02 | 8.3509E−02 | −4.1658E−02 | 1.0838E−02 |
| S10 | 6.4471E−02 | −1.0747E−01 | 7.5997E−02 | −3.3902E−02 | 9.8772E−03 |

| surface number | A14 | A16 | A18 | A20 |
|---|---|---|---|---|
| S1 | 7.3235E+00 | −5.2554E+00 | 2.0830E+00 | −3.4830E−01 |
| S2 | −3.7639E+01 | 2.6120E+01 | −1.0221E+01 | 1.7250E+00 |
| S3 | −4.7172E+01 | 3.6375E+01 | −1.5770E+01 | 2.9395E+00 |
| S4 | 3.6217E+01 | −5.4427E+01 | 4.0193E+01 | −1.1727E+01 |
| S5 | −3.7769E+01 | 5.4733E+01 | −4.0424E+01 | 1.2203E+01 |
| S6 | 2.4933E+00 | −1.9413E+00 | 8.3431E−01 | −1.4939E−01 |
| S7 | 4.1541E−02 | 8.1902E−02 | −4.2982E−02 | 6.4761E−03 |
| S8 | −2.5881E−01 | 7.8809E−02 | −1.2714E−02 | 8.4692E−04 |
| S9 | −1.5624E−03 | 1.1085E−04 | −1.5586E−06 | −1.5803E−07 |
| S10 | −1.8949E−03 | 2.3223E−04 | −1.6484E−05 | 5.1520E−07 |

TABLE 12

| parameter | | | | | | |
|---|---|---|---|---|---|---|
| f1 (mm) | f2 (mm) | f3 (mm) | f4 (mm) | f5 (mm) | f (mm) | TTL (mm) |
| value 4.01 | −45.95 | −27.88 | 2.68 | −2.34 | 3.98 | 4.50 |

Figure 8A:
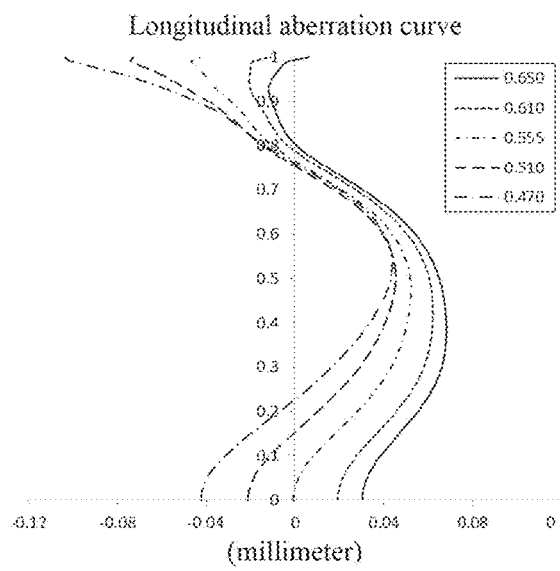
FIGS. 8A-8D respectively illustrate a longitudinal aberration curve, an astigmatic curve, a distortion curve and a relative illumination curve of the optical imaging lens assembly according to Embodiment 4.
Figure 8B:
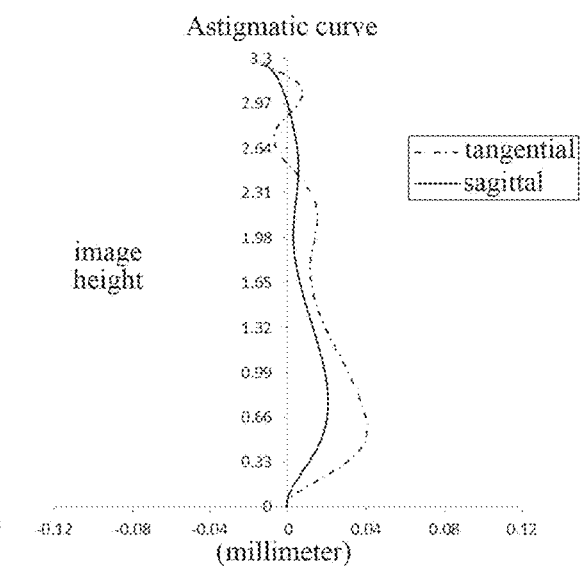
Figure 8C:
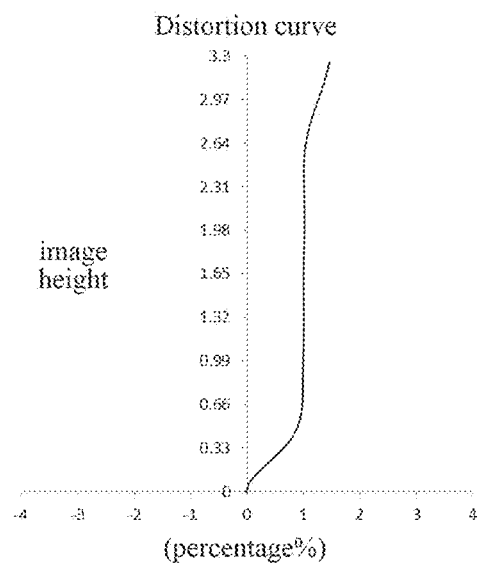
Figure 8D:
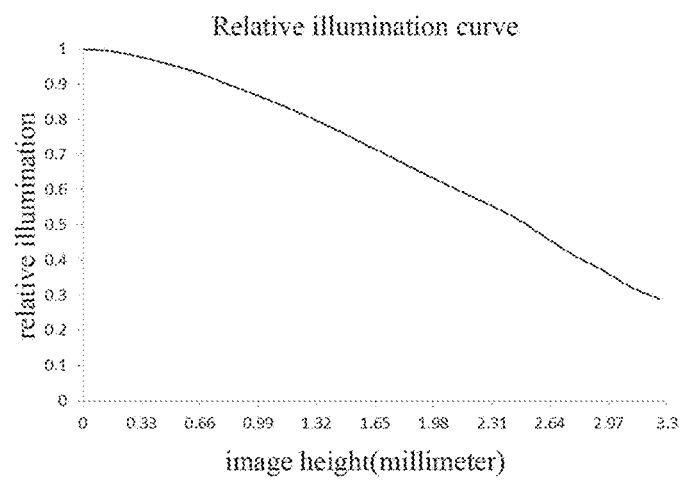

FIG. 8A shows a longitudinal aberration curve of the optical imaging lens assembly according to Embodiment 4, representing deviations of converged focal points of light of different wavelengths after passing through the lens assembly. FIG. 8B shows an astigmatic curve of the optical imaging lens assembly according to Embodiment 4, representing a curvature of a tangential image plane and a curvature of a sagittal image plane. FIG. 8C shows a distortion curve of the optical imaging lens assembly according to Embodiment 4, representing amounts of distortion at different viewing angles. FIG. 8D shows a relative illumination curve of the optical imaging lens assembly according to Embodiment 4, representing relative illuminations corresponding to different image heights on the image plane. According to FIG. 8A to FIG. 8D, it may be seen that the optical imaging lens assembly according to Embodiment 4 can achieve a good image quality.

Embodiment 5

An optical imaging lens assembly according to Embodiment 5 of the present disclosure is described below with reference to FIGS. 9-10D. FIG. 9 illustrates a schematic structural diagram of the optical imaging lens assembly according to Embodiment 5 of the present disclosure.

As shown in FIG. 9, the optical imaging lens assembly includes a first lens E1, a second lens E2, a third lens E3, a fourth lens E4, a fifth lens E5, and an image plane S13 sequentially from an object side to an image side along an optical axis. The optical imaging lens assembly may further include a photosensitive element disposed on the image plane S13.

The first lens E1 has a positive refractive power, an object-side surface S1 of the first lens E1 is a convex surface, and an image-side surface S2 of the first lens E1 is a concave surface. Both the object-side surface S1 and the image-side surface S2 of the first lens E1 are aspheric surfaces.

The second lens E2 has a negative refractive power, an object-side surface S3 of the second lens E2 is a convex surface, and an image-side surface S4 of the second lens E2 is a concave surface. Both the object-side surface S3 and the image-side surface S4 of the second lens E2 are aspheric surfaces.

The third lens E3 has a negative refractive power, an object-side surface S5 of the third lens E3 is a concave surface, and an image-side surface S6 of the third lens E3 is a convex surface. Both the object-side surface S5 and the image-side surface S6 of the third lens E3 are aspheric surfaces.

The fourth lens E4 has a positive refractive power, an object-side surface S7 of the fourth lens E4 is a plane surface, and an image-side surface S8 of the fourth lens E4 is a convex surface. Both the object-side surface S7 and the image-side surface S8 of the fourth lens E4 are aspheric surfaces.

The fifth lens E5 has a negative refractive power, an object-side surface S9 of the fifth lens E5 is a concave surface, and an image-side surface S10 of the fifth lens E5 is a convex surface. Both the object-side surface S9 and the image-side surface S10 of the fifth lens E5 are aspheric surfaces.

Alternatively, the optical imaging lens assembly may further include an optical filter E6 having an object-side surface S11 and an image-side surface S12. Light from an object sequentially passes through the surfaces S1-S12 and finally forms an image on the image plane S13.

Alternatively, the optical imaging lens assembly may further include a diaphragm STO disposed between the object side and the first lens E1, to improve the image quality.

Table 13 shows the surface type, the radius of curvature, the thickness, the material and the conic coefficient of each lens of the optical imaging lens assembly in Embodiment 5. The radius of curvature and the thickness are shown in millimeters (mm). Table 14 shows the high-order coefficients applicable to the aspheric mirror surfaces in Embodiment 5. The surface type of each aspheric surface may be defined by formula (1) given in the above Embodiment 1. Table 15 shows the effective focal lengths f1-f5 of the lenses, the total effective focal length f of the optical imaging lens assembly, and the total track length TTL of the optical imaging lens assembly in Embodiment 5.

TABLE 13

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4178 | | | |
| S1 | aspheric | 1.4279 | 0.7313 | 1.55 | 56.1 | −0.3888 |
| S2 | aspheric | 3.3333 | 0.0226 | | | −88.8572 |
| S3 | aspheric | 3.6583 | 0.2460 | 1.67 | 20.4 | −51.6909 |
| S4 | aspheric | 3.1711 | 0.4537 | | | 10.7312 |
| S5 | aspheric | −12.0084 | 0.3903 | 1.55 | 56.1 | −96.5882 |
| S6 | aspheric | −52.5657 | 0.3216 | | | −99.0000 |
| S7 | aspheric | infinite | 0.5418 | 1.55 | 56.1 | 99.0000 |
| S8 | aspheric | −1.4655 | 0.4762 | | | −1.3379 |
| S9 | aspheric | −0.8743 | 0.4000 | 1.54 | 55.9 | −3.8631 |
| S10 | aspheric | −3.3405 | 0.3618 | | | −99.0000 |
| S11 | spherical | infinite | 0.2100 | 1.52 | 64.2 | |
| S12 | spherical | infinite | 0.3432 | | | |
| S13 | spherical | infinite | | | | |

TABLE 14

| surface number | A4 | A6 | A8 | A10 | A12 |
|---|---|---|---|---|---|
| S1 | −1.0080E−02 | 2.0714E−01 | −1.0925E+00 | 3.4303E+00 | −6.6973E+00 |
| S2 | −2.0949E−01 | −6.6330E−01 | 6.3192E+00 | −2.0880E+01 | 3.9596E+01 |
| S3 | −2.8714E−01 | −5.2957E−02 | 4.9698E+00 | −1.9639E+01 | 4.1702E+01 |
| S4 | −4.5236E−02 | 1.0601E−01 | 3.0280E−01 | 1.6646E+00 | −1.7093E+01 |
| S5 | −2.1213E−01 | 1.4378E−01 | 9.0617E−01 | −1.0293E+01 | 4.2170E+01 |
| S6 | −1.6253E−01 | −7.6146E−02 | 5.0550E−01 | −1.5583E+00 | 2.6183E+00 |
| S7 | −1.0974E−01 | 7.1183E−02 | −6.3436E−02 | −2.7529E−01 | 6.7823E−01 |
| S8 | 3.6545E−02 | −1.1101E−01 | 3.1258E−01 | −5.2121E−01 | 4.8801E−01 |
| S9 | −3.7212E−02 | −5.2824E−02 | 9.3564E−02 | −5.4489E−02 | 1.7635E−02 |
| S10 | 7.6205E−02 | −1.2926E−01 | 9.8624E−02 | −4.7759E−02 | 1.5151E−02 |

TABLE 14-continued

| surface number | A14 | A16 | A18 | A20 |
|---|---|---|---|---|
| S1 | 8.1405E+00 | −6.0212E+00 | 2.4619E+00 | −4.2524E−01 |
| S2 | −4.6889E+01 | 3.4256E+01 | −1.4129E+01 | 2.5144E+00 |
| S3 | −5.4428E+01 | 4.3628E+01 | −1.9657E+01 | 3.8035E+00 |
| S4 | 5.2917E+01 | −8.0712E+01 | 6.2107E+01 | −1.9204E+01 |
| S5 | −9.4634E+01 | 1.2172E+02 | −8.4356E+01 | 2.4515E+01 |
| S6 | −2.6213E+00 | 1.5317E+00 | −4.6810E−01 | 5.8527E−02 |
| S7 | −7.3220E−01 | 4.2890E−01 | −1.2903E−01 | 1.5512E−02 |
| S8 | −2.5962E−01 | 7.8651E−02 | −1.2698E−02 | 8.5034E−04 |
| S9 | −3.5213E−03 | 4.3364E−04 | −3.0316E−05 | 9.2279E−07 |
| S10 | −3.1552E−03 | 4.1580E−04 | −3.1329E−05 | 1.0238E−06 |

TABLE 15

| parameter | | | | | | |
|---|---|---|---|---|---|---|
| f1 (mm) | f2 (mm) | f3 (mm) | f4 (mm) | f5 (mm) | f (mm) | TTL (mm) |
| 4.03 | −44.81 | −28.61 | 2.69 | −2.34 | 3.98 | 4.50 |

Figures 10C, 10D:
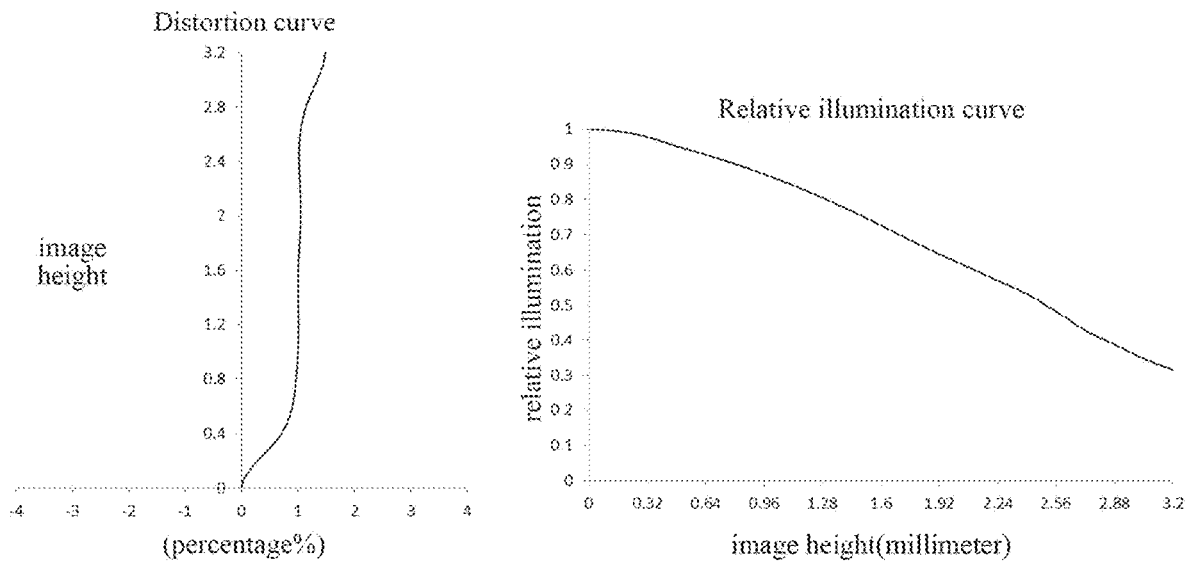

FIG. 10A shows a longitudinal aberration curve of the optical imaging lens assembly according to Embodiment 5, representing deviations of converged focal points of light of different wavelengths after passing through the lens assembly. FIG. 10B shows an astigmatic curve of the optical imaging lens assembly according to Embodiment 5, representing a curvature of a tangential image plane and a curvature of a sagittal image plane. FIG. 10C shows a distortion curve of the optical imaging lens assembly according to Embodiment 5, representing amounts of distortion at different viewing angles. FIG. 10D shows a relative illumination curve of the optical imaging lens assembly according to Embodiment 5, representing relative illuminations corresponding to different image heights on the image plane. According to FIG. 10A to FIG. 10D, it may be seen that the optical imaging lens assembly according to Embodiment 5 can achieve a good image quality.

Embodiment 6

Figure 11:
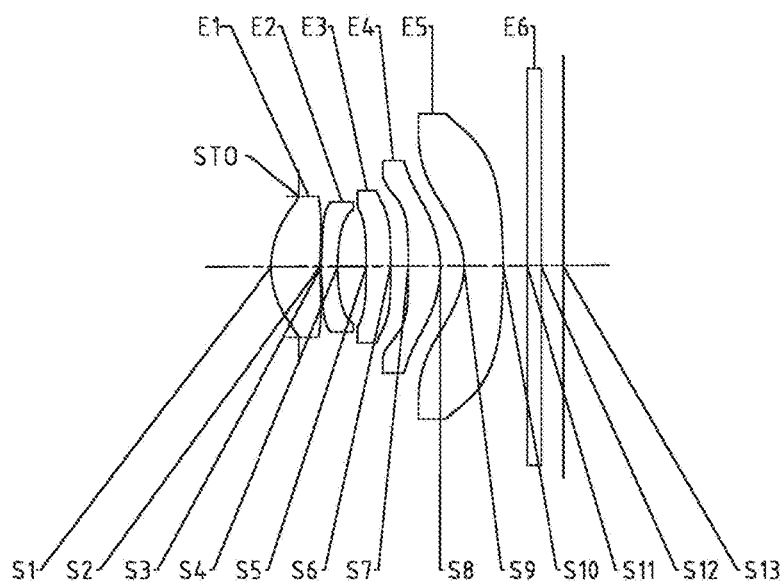
FIG. 11 illustrates a schematic structural diagram of an optical imaging lens assembly according to Embodiment 6 of the present disclosure.

An optical imaging lens assembly according to Embodiment 6 of the present disclosure is described below with reference to FIGS. 11-12D. FIG. 11 illustrates a schematic structural diagram of the optical imaging lens assembly according to Embodiment 6 of the present disclosure.

As shown in FIG. 11, the optical imaging lens assembly includes a first lens E1, a second lens E2, a third lens E3, a fourth lens E4, a fifth lens E5, and an image plane S13 sequentially from an object side to an image side along an optical axis. The optical imaging lens assembly may further include a photosensitive element disposed on the image plane S13.

The first lens E1 has a positive refractive power, an object-side surface S1 of the first lens E1 is a convex surface, and an image-side surface S2 of the first lens E1 is a concave surface. Both the object-side surface S1 and the image-side surface S2 of the first lens E1 are aspheric surfaces.

The second lens E2 has a positive refractive power, an object-side surface S3 of the second lens E2 is a convex surface, and an image-side surface S4 of the second lens E2 is a concave surface. Both the object-side surface S3 and the image-side surface S4 of the second lens E2 are aspheric surfaces.

The third lens E3 has a negative refractive power, an object-side surface S5 of the third lens E3 is a concave surface, and an image-side surface S6 of the third lens E3 is a concave surface. Both the object-side surface S5 and the image-side surface S6 of the third lens E3 are aspheric surfaces.

The fourth lens E4 has a positive refractive power, an object-side surface S7 of the fourth lens E4 is a plane surface, and an image-side surface S8 of the fourth lens E4 is a convex surface. Both the object-side surface S7 and the image-side surface S8 of the fourth lens E4 are aspheric surfaces.

The fifth lens E5 has a negative refractive power, an object-side surface S9 of the fifth lens E5 is a concave surface, and an image-side surface S10 of the fifth lens E5 is a convex surface. Both the object-side surface S9 and the image-side surface S10 of the fifth lens E5 are aspheric surfaces.

Alternatively, the optical imaging lens assembly may further include an optical filter E6 having an object-side surface S11 and an image-side surface S12. Light from an object sequentially passes through the surfaces S1-S12 and finally forms an image on the image plane S13.

Alternatively, the optical imaging lens assembly may further include a diaphragm STO disposed between the object side and the first lens E1, to improve the image quality.

Table 16 shows the surface type, the radius of curvature, the thickness, the material and the conic coefficient of each lens of the optical imaging lens assembly in Embodiment 6. The radius of curvature and the thickness are shown in millimeters (mm). Table 17 shows the high-order coefficients applicable to the aspheric mirror surfaces in Embodiment 6. The surface type of each aspheric surface may be defined by formula (1) given in the above Embodiment 1. Table 18 shows the effective focal lengths f1-f5 of the lenses, the total effective focal length f of the optical imaging lens assembly, and the total track length TTL of the optical imaging lens assembly in Embodiment 6.

TABLE 16

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4196 | | | |
| S1 | aspheric | 1.3668 | 0.7351 | 1.55 | 56.1 | −0.4297 |
| S2 | aspheric | 2.7658 | 0.0202 | | | −74.4016 |
| S3 | aspheric | 3.0310 | 0.2460 | 1.67 | 20.4 | −47.6853 |
| S4 | aspheric | 3.0733 | 0.4303 | | | 10.6709 |
| S5 | aspheric | −22.7614 | 0.3655 | 1.55 | 56.1 | −99.0000 |
| S6 | aspheric | 91.2285 | 0.2666 | | | 99.0000 |
| S7 | aspheric | infinite | 0.4833 | 1.55 | 56.1 | −99.0000 |
| S8 | aspheric | −1.5754 | 0.3554 | | | −1.3450 |
| S9 | aspheric | −1.0434 | 0.5902 | 1.54 | 55.9 | −3.6945 |
| S10 | aspheric | −6.4994 | 0.3618 | | | −81.7897 |
| S11 | spherical | infinite | 0.2100 | 1.52 | 64.2 | |
| S12 | spherical | infinite | 0.3432 | | | |
| S13 | spherical | infinite | | | | |

TABLE 17

| surface number | A4 | A6 | A8 | A10 | A12 |
|---|---|---|---|---|---|
| S1 | −8.3891E−03 | 2.3549E−01 | −1.3655E+00 | 4.4847E+00 | −9.0066E+00 |
| S2 | −2.2761E−01 | −8.8180E−01 | 7.9560E+00 | −2.6628E+01 | 5.1665E+01 |
| S3 | −3.0117E−01 | −5.6378E−02 | 5.3924E+00 | −2.1435E+01 | 4.6114E+01 |
| S4 | −4.0790E−02 | 1.8354E−01 | 7.0735E−02 | 2.0816E+00 | −1.7525E+01 |
| S5 | −2.4018E−01 | 4.8639E−01 | −1.6980E−01 | −9.6325E+00 | 4.9490E+01 |
| S6 | −1.7707E−01 | 7.6046E−03 | 1.8218E−01 | −5.4545E−01 | 7.6844E−01 |
| S7 | −2.0749E−01 | 5.6905E−01 | −1.8273E+00 | 3.3230E+00 | −3.7966E+00 |
| S8 | 8.5104E−02 | −3.5251E−01 | 9.1400E−01 | −1.3906E+00 | 1.2551E+00 |
| S9 | −2.6930E−02 | −1.2611E−01 | 2.1278E−01 | −1.4087E−01 | 5.2788E−02 |
| S10 | 3.4457E−02 | −5.9888E−02 | 2.5310E−02 | −3.5624E−04 | −4.2969E−03 |

| surface number | A14 | A16 | A18 | A20 |
|---|---|---|---|---|
| S1 | 1.1210E+01 | −8.4991E+00 | 3.5706E+00 | −6.3401E−01 |
| S2 | −6.2744E+01 | 4.7009E+01 | −1.9859E+01 | 3.6145E+00 |
| S3 | −6.1358E+01 | 5.0431E+01 | −2.3387E+01 | 4.6726E+00 |
| S4 | 5.3193E+01 | −8.0101E+01 | 6.0162E+01 | −1.7687E+01 |
| S5 | −1.2137E+02 | 1.6398E+02 | −1.1724E+02 | 3.4688E+01 |
| S6 | −6.8952E−01 | 4.3837E−01 | −1.6221E−01 | 2.4300E−02 |
| S7 | 2.6059E+00 | −9.9361E−01 | 1.8464E−01 | −1.1681E−02 |
| S8 | −6.7284E−01 | 2.1064E−01 | −3.5628E−02 | 2.5180E−03 |
| S9 | −1.2201E−02 | 1.7329E−03 | −1.3906E−04 | 4.8267E−06 |
| S10 | 1.9264E−03 | −4.0302E−04 | 4.2529E−05 | −1.8114E−06 |

TABLE 18

| parameter | | | | | | |
|---|---|---|---|---|---|---|
| f1 (mm) | f2 (mm) | f3 (mm) | f4 (mm) | f5 (mm) | f (mm) | TTL (mm) |
| value 4.18 | 99.52 | −33.33 | 2.89 | −2.41 | 3.98 | 4.41 |

Figure 12A:
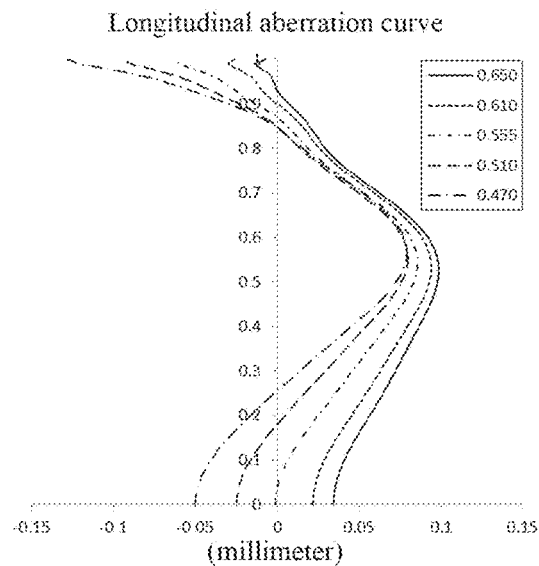
FIGS. 12A-12D respectively illustrate a longitudinal aberration curve, an astigmatic curve, a distortion curve and a relative illumination curve of the optical imaging lens assembly according to Embodiment 6.
Figure 12B:
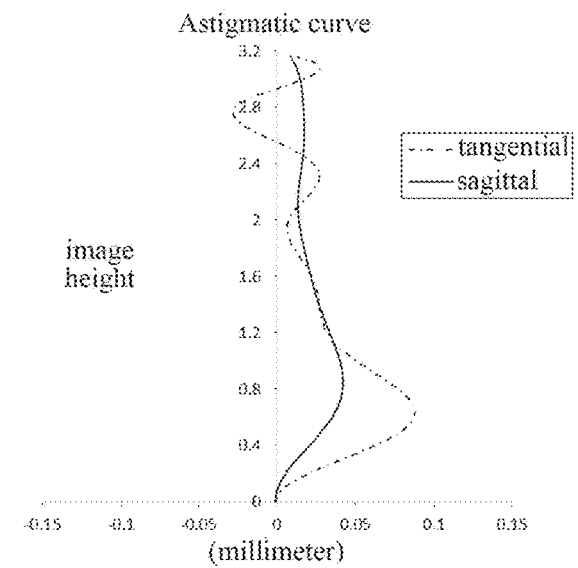
Figure 12C:
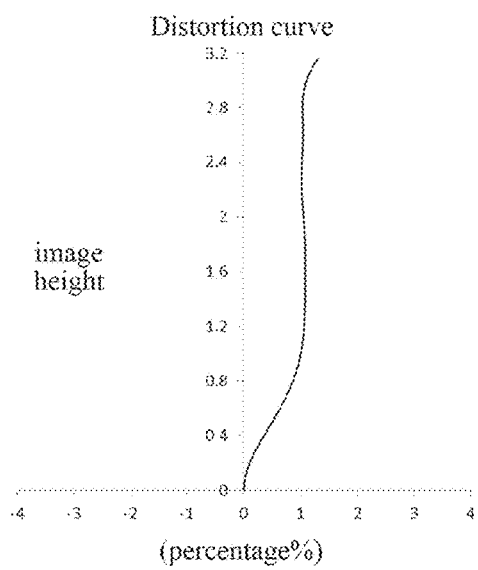
Figure 12D:
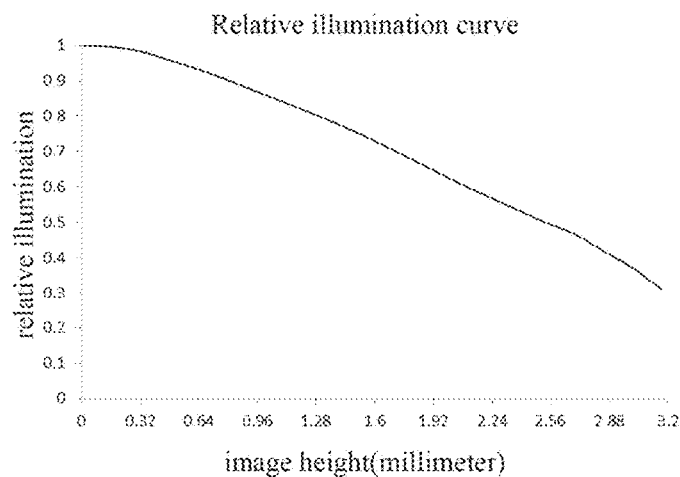

FIG. 12A shows a longitudinal aberration curve of the optical imaging lens assembly according to Embodiment 6, representing deviations of converged focal points of light of different wavelengths after passing through the lens assembly. FIG. 12B shows an astigmatic curve of the optical imaging lens assembly according to Embodiment 6, representing a curvature of a tangential image plane and a curvature of a sagittal image plane. FIG. 12C shows a distortion curve of the optical imaging lens assembly according to Embodiment 6, representing amounts of distortion at different viewing angles. FIG. 12D shows a relative illumination curve of the optical imaging lens assembly according to Embodiment 6, representing relative illuminations corresponding to different image heights on the image plane. According to FIG. 12A to FIG. 12D, it may be seen that the optical imaging lens assembly according to Embodiment 6 can achieve a good image quality.

Embodiment 7

Figure 13:
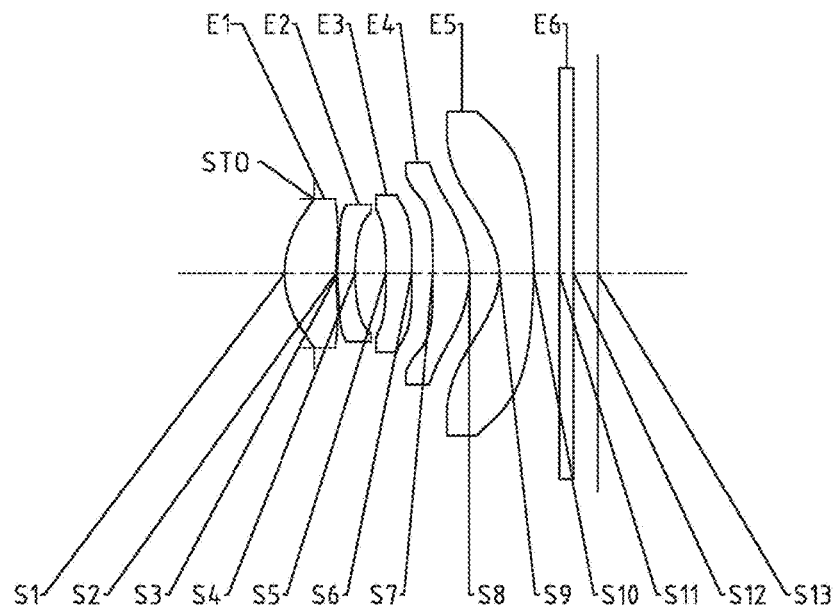
FIG. 13 illustrates a schematic structural diagram of an optical imaging lens assembly according to Embodiment 7 of the present disclosure.

An optical imaging lens assembly according to Embodiment 7 of the present disclosure is described below with reference to FIGS. 13-14D. FIG. 13 illustrates a schematic structural diagram of the optical imaging lens assembly according to Embodiment 7 of the present disclosure.

As shown in FIG. 13, the optical imaging lens assembly includes a first lens E1, a second lens E2, a third lens E3, a fourth lens E4, a fifth lens E5, and an image plane S13 sequentially from an object side to an image side along an optical axis. The optical imaging lens assembly may further include a photosensitive element disposed on the image plane S13.

The first lens E1 has a positive refractive power, an object-side surface S1 of the first lens E1 is a convex surface, and an image-side surface S2 of the first lens E1 is a concave surface. Both the object-side surface S1 and the image-side surface S2 of the first lens E1 are aspheric surfaces.

The second lens E2 has a positive refractive power, an object-side surface S3 of the second lens E2 is a convex surface, and an image-side surface S4 of the second lens E2 is a concave surface. Both the object-side surface S3 and the image-side surface S4 of the second lens E2 are aspheric surfaces.

The third lens E3 has a negative refractive power, an object-side surface S5 of the third lens E3 is a concave surface, and an image-side surface S6 of the third lens E3 is a concave surface. Both the object-side surface S5 and the image-side surface S6 of the third lens E3 are aspheric surfaces.

The fourth lens E4 has a positive refractive power, an object-side surface S7 of the fourth lens E4 is a convex surface, and an image-side surface S8 of the fourth lens E4 is a convex surface. Both the object-side surface S7 and the image-side surface S8 of the fourth lens E4 are aspheric surfaces.

The fifth lens E5 has a negative refractive power, an object-side surface S9 of the fifth lens E5 is a concave surface, and an image-side surface S10 of the fifth lens E5 is a convex surface. Both the object-side surface S9 and the image-side surface S10 of the fifth lens E5 are aspheric surfaces.

Alternatively, the optical imaging lens assembly may further include an optical filter E6 having an object-side surface S11 and an image-side surface S12. Light from an object sequentially passes through the surfaces S1-S12 and finally forms an image on the image plane S13.

Alternatively, the optical imaging lens assembly may further include a diaphragm STO disposed between the object side and the first lens E1, to improve the image quality.

Table 19 shows the surface type, the radius of curvature, the thickness, the material and the conic coefficient of each lens of the optical imaging lens assembly in Embodiment 7. The radius of curvature and the thickness are shown in millimeters (mm). Table 20 shows the high-order coefficients applicable to the aspheric mirror surfaces in Embodiment 7. The surface type of each aspheric surface may be defined by formula (1) given in the above Embodiment 1. Table 21 shows the effective focal lengths f1-f5 of the lenses, the total effective focal length f of the optical imaging lens assembly, and the total track length TTL of the optical imaging lens assembly in Embodiment 7.

TABLE 19

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.4161 | | | |
| S1 | aspheric | 1.3887 | 0.7285 | 1.55 | 56.1 | −0.4152 |
| S2 | aspheric | 2.7219 | 0.0217 | | | −74.0883 |
| S3 | aspheric | 2.9816 | 0.2460 | 1.67 | 20.4 | −52.2277 |
| S4 | aspheric | 3.0597 | 0.4356 | | | 10.4752 |
| S5 | aspheric | −20.0131 | 0.3642 | 1.55 | 56.1 | −73.2394 |
| S6 | aspheric | 38.2700 | 0.2968 | | | 99.0000 |
| S7 | aspheric | 54.3112 | 0.5185 | 1.55 | 56.1 | 84.0201 |
| S8 | aspheric | −1.5315 | 0.4242 | | | −1.3786 |
| S9 | aspheric | −0.9206 | 0.4839 | 1.54 | 55.9 | −3.6304 |
| S10 | aspheric | −3.7925 | 0.3618 | | | −99.0000 |
| S11 | spherical | infinite | 0.2100 | 1.52 | 64.2 | |
| S12 | spherical | infinite | 0.3432 | | | |
| S13 | spherical | infinite | | | | |

TABLE 20

| surface number | A4 | A6 | A8 | A10 | A12 |
|---|---|---|---|---|---|
| S1 | −6.3818E−03 | 1.7802E−01 | −1.0118E+00 | 3.4147E+00 | −7.0881E+00 |
| S2 | −2.1827E−01 | −8.0348E−01 | 7.3372E+00 | −2.4531E+01 | 4.7574E+01 |
| S3 | −3.0135E−01 | −5.3848E−01 | 5.1591E+00 | −2.1008E+01 | 4.5688E+01 |
| S4 | −6.0050E−02 | 1.7866E−01 | 2.2682E−01 | 1.9817E+00 | −2.0459E+01 |
| S5 | −2.3173E−01 | 3.1544E−01 | 8.9952E−03 | −6.7796E+00 | 3.3259E+01 |
| S6 | −1.7122E−01 | −5.8849E−02 | 2.8063E−01 | −3.8545E−01 | −3.5225E−01 |
| S7 | −1.6562E−01 | 4.7520E−01 | −1.5957E+00 | 2.8463E+00 | −3.1034E+00 |
| S8 | 3.2014E−02 | −2.9839E−02 | 2.6805E−02 | −8.7774E−02 | 1.4010E−01 |
| S9 | 1.0683E−02 | −2.2491E−01 | 3.2500E−01 | −2.0946E−01 | 7.6511E−02 |
| S10 | 5.6027E−02 | −1.1038E−01 | 8.0007E−02 | −3.3072E−02 | 7.6216E−03 |

| surface number | A14 | A16 | A18 | A20 |
|---|---|---|---|---|
| S1 | 9.0494E+00 | −6.9715E+00 | 2.9496E+00 | −5.2467E−01 |
| S2 | −5.7873E+01 | 4.3507E+01 | −1.8466E+01 | 3.3804E+00 |

TABLE 20-continued

| | | | | |
|---|---|---|---|---|
| S3 | −6.0990E+01 | 4.9941E+01 | −2.2952E+01 | 4.5270E+00 |
| S4 | 6.6175E+01 | −1.0523E+02 | 8.4132E+01 | −2.6957E+01 |
| S5 | −8.0845E+01 | 1.0983E+02 | −7.9667E+01 | 2.4125E+01 |
| S6 | 1.6168E+00 | −1.9498E+00 | 1.0838E+00 | −2.3353E−01 |
| S7 | 2.0326E+00 | −7.5678E−01 | 1.4481E−01 | −1.0801E−02 |
| S8 | −9.8059E−02 | 3.4559E−02 | −6.0615E−03 | 4.2013E−04 |
| S9 | −1.6775E−02 | 2.1669E−03 | −1.4929E−04 | 4.0762E−06 |
| S10 | −7.9060E−04 | −2.3624E−05 | 1.2789E−05 | −8.0739E−07 |

TABLE 21

| parameter | | | | | | |
|---|---|---|---|---|---|---|
| f1 (mm) | f2 (mm) | f3 (mm) | f4 (mm) | f5 (mm) | f (mm) | TTL (mm) |
| 4.35 | 77.64 | −24.02 | 2.74 | −2.41 | 3.98 | 4.43 | value

Figures 14A, 14B:
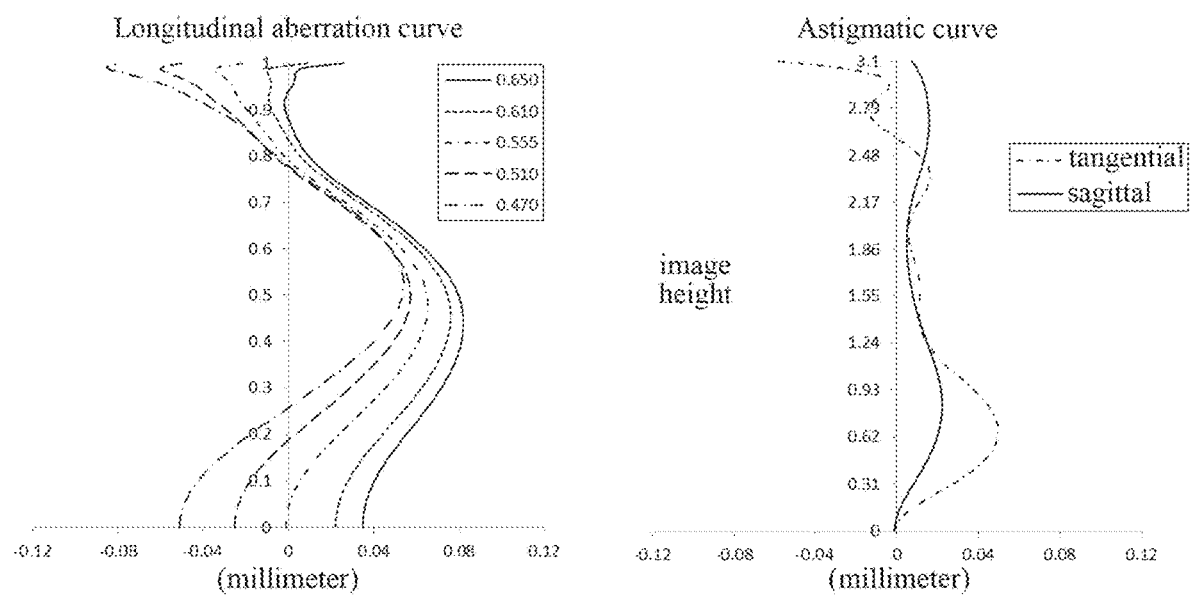
FIGS. 14A-14D respectively illustrate a longitudinal aberration curve, an astigmatic curve, a distortion curve and a relative illumination curve of the optical imaging lens assembly according to Embodiment 7.
Figures 14C, 14D:
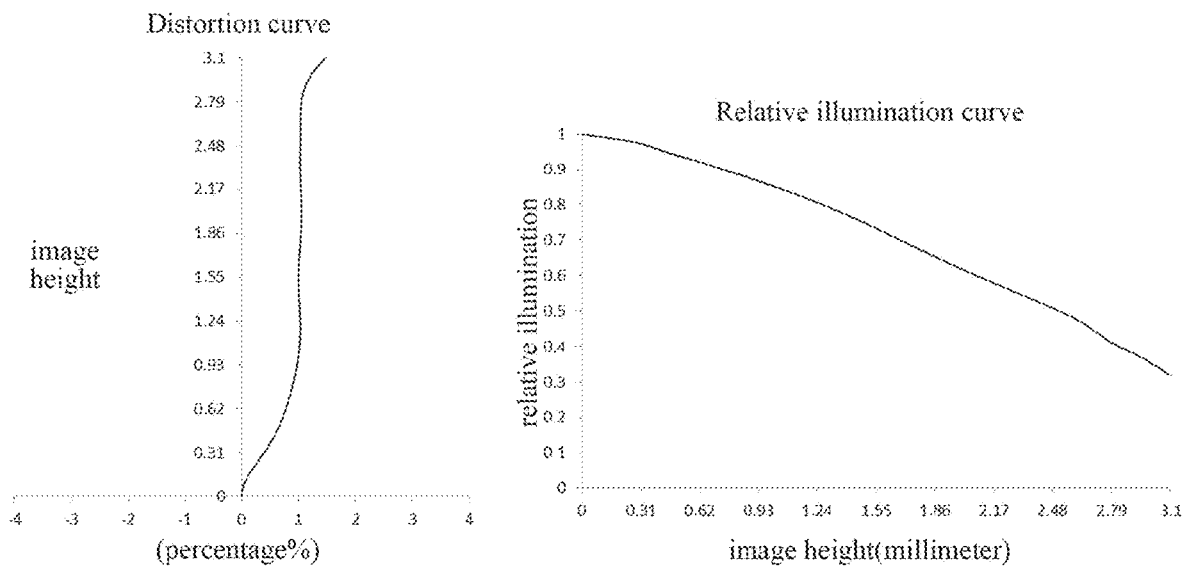

FIG. 14A shows a longitudinal aberration curve of the optical imaging lens assembly according to Embodiment 7, representing deviations of converged focal points of light of different wavelengths after passing through the lens assembly. FIG. 14B shows an astigmatic curve of the optical imaging lens assembly according to Embodiment 7, representing a curvature of a tangential image plane and a curvature of a sagittal image plane. FIG. 14C shows a distortion curve of the optical imaging lens assembly according to Embodiment 7, representing amounts of distortion at different viewing angles. FIG. 14D shows a relative illumination curve of the optical imaging lens assembly according to Embodiment 7, representing relative illuminations corresponding to different image heights on the image plane. According to FIG. 14A to FIG. 14D, it may be seen that the optical imaging lens assembly according to Embodiment 7 can achieve a good image quality.

Embodiment 8

Figure 15:
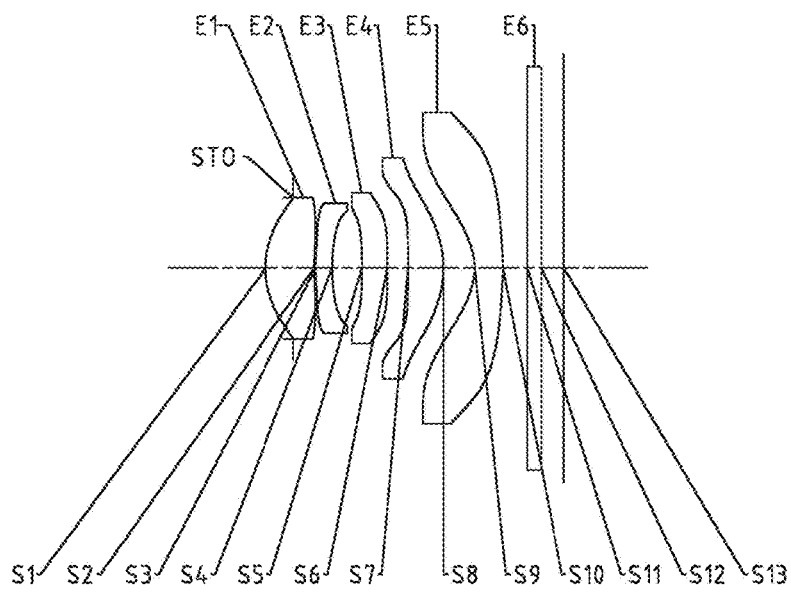
FIG. 15 illustrates a schematic structural diagram of an optical imaging lens assembly according to Embodiment 8 of the present disclosure.

An optical imaging lens assembly according to Embodiment 8 of the present disclosure is described below with reference to FIGS. 15-16D. FIG. 15 illustrates a schematic structural diagram of the optical imaging lens assembly according to Embodiment 8 of the present disclosure.

As shown in FIG. 15, the optical imaging lens assembly includes a first lens E1, a second lens E2, a third lens E3, a fourth lens E4, a fifth lens E5, and an image plane S13 sequentially from an object side to an image side along an optical axis. The optical imaging lens assembly may further include a photosensitive element disposed on the image plane S13.

The first lens E1 has a positive refractive power, an object-side surface S1 of the first lens E1 is a convex surface, and an image-side surface S2 of the first lens E1 is a concave surface. Both the object-side surface S1 and the image-side surface S2 of the first lens E1 are aspheric surfaces.

The second lens E2 has a positive refractive power, an object-side surface S3 of the second lens E2 is a convex surface, and an image-side surface S4 of the second lens E2 is a concave surface. Both the object-side surface S3 and the image-side surface S4 of the second lens E2 are aspheric surfaces.

The third lens E3 has a negative refractive power, an object-side surface S5 of the third lens E3 is a concave surface, and an image-side surface S6 of the third lens E3 is a concave surface. Both the object-side surface S5 and the image-side surface S6 of the third lens E3 are aspheric surfaces.

The fourth lens E4 has a positive refractive power, an object-side surface S7 of the fourth lens E4 is a convex surface, and an image-side surface S8 of the fourth lens E4 is a convex surface. Both the object-side surface S7 and the image-side surface S8 of the fourth lens E4 are aspheric surfaces.

The fifth lens E5 has a negative refractive power, an object-side surface S9 of the fifth lens E5 is a concave surface, and an image-side surface S10 of the fifth lens E5 is a convex surface. Both the object-side surface S9 and the image-side surface S10 of the fifth lens E5 are aspheric surfaces.

Alternatively, the optical imaging lens assembly may further include an optical filter E6 having an object-side surface S11 and an image-side surface S12. Light from an object sequentially passes through the surfaces S1-S12 and finally forms an image on the image plane S13.

Alternatively, the optical imaging lens assembly may further include a diaphragm STO disposed between the object side and the first lens E1, to improve the image quality.

Table 22 shows the surface type, the radius of curvature, the thickness, the material and the conic coefficient of each lens of the optical imaging lens assembly in Embodiment 8. The radius of curvature and the thickness are shown in millimeters (mm). Table 23 shows the high-order coefficients applicable to the aspheric mirror surfaces in Embodiment 8. The surface type of each aspheric surface may be defined by formula (1) given in the above Embodiment 1. Table 24 shows the effective focal lengths f1-f5 of the lenses, the total effective focal length f of the optical imaging lens assembly, and the total track length TTL of the optical imaging lens assembly in Embodiment 8.

TABLE 22

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.4143 | | | |
| S1 | aspheric | 1.4018 | 0.7277 | 1.55 | 56.1 | −0.4057 |
| S2 | aspheric | 2.8599 | 0.0218 | | | −78.4262 |
| S3 | aspheric | 3.1412 | 0.2460 | 1.67 | 20.4 | −54.9871 |

TABLE 22-continued

| surface number | surface type | radius of curvature | thickness | material refractive index | abbe number | conic coefficient |
|---|---|---|---|---|---|---|
| S4 | aspheric | 3.0856 | 0.4444 | | | 10.5232 |
| S5 | aspheric | −13.4266 | 0.3762 | 1.55 | 56.1 | −72.8003 |
| S6 | aspheric | 562.9928 | 0.3083 | | | 99.0000 |
| S7 | aspheric | 58.5077 | 0.5272 | 1.55 | 56.1 | 99.0000 |
| S8 | aspheric | −1.5427 | 0.4665 | | | −1.3310 |
| S9 | aspheric | −0.8862 | 0.4194 | 1.54 | 55.9 | −3.5386 |
| S10 | aspheric | −3.2230 | 0.3618 | | | −81.0980 |
| S11 | spherical | infinite | 0.2100 | 1.52 | 64.2 | |
| S12 | spherical | infinite | 0.3432 | | | |
| S13 | spherical | infinite | | | | |

TABLE 23

| surface number | A4 | A6 | A8 | A10 | A12 |
|---|---|---|---|---|---|
| S1 | −6.7529E−03 | 1.7866E−01 | −1.0010E+00 | 3.3465E+00 | −6.9005E+00 |
| S2 | −2.1936E−01 | −7.8065E−01 | 7.2748E+00 | −2.4481E+01 | 4.7738E+01 |
| S3 | −3.0032E−01 | −4.8260E−03 | 5.1176E+00 | −2.0916E+01 | 4.5714E+01 |
| S4 | −5.5656E−02 | 1.6030E−01 | 2.0753E−01 | 2.2235E+00 | −2.1260E+01 |
| S5 | −2.3037E−01 | 2.9156E−01 | 2.2117E−02 | −6.7028E+00 | 3.2871E+01 |
| S6 | −1.8150E−01 | 9.5140E−03 | 6.1966E−03 | 2.3970E−01 | −1.2806E+00 |
| S7 | −1.2061E−01 | 1.7365E−01 | −5.3370E−01 | 7.1313E−01 | −4.9093E−01 |
| S8 | 3.3803E−02 | −6.8749E−02 | 1.4440E−01 | −2.6722E−01 | 2.9894E−01 |
| S9 | 7.7721E−03 | −1.9805E−01 | 2.7929E−01 | −1.7609E−01 | 6.3751E−02 |
| S10 | 6.6052E−02 | −1.2847E−01 | 1.0260E−01 | −5.0265E−02 | 1.5727E−02 |

| surface number | A14 | A16 | A18 | A20 |
|---|---|---|---|---|
| S1 | 8.7706E+00 | −6.7332E+00 | 2.8410E+00 | −5.0462E−01 |
| S2 | −5.8402E+01 | 4.4159E+01 | −1.8851E+01 | 3.4700E+00 |
| S3 | −6.1437E+01 | 5.0692E+01 | −2.3481E+01 | 4.6650E+00 |
| S4 | 6.7787E+01 | −1.0752E+02 | 8.6189E+01 | −2.7791E+01 |
| S5 | −7.9909E+01 | 1.0847E+02 | −7.8642E+01 | 2.3850E+01 |
| S6 | 2.5416E+00 | −2.5625E+00 | 1.3244E+00 | −2.7398E−01 |
| S7 | 7.6316E−02 | 1.0995E−01 | −6.3211E−02 | 1.0044E−02 |
| S8 | −1.8352E−01 | 6.2144E−02 | −1.0969E−02 | 7.8980E−04 |
| S9 | −1.4120E−02 | 1.8915E−03 | −1.4049E−04 | 4.4198E−06 |
| S10 | −3.1660E−03 | 3.9655E−04 | −2.8088E−05 | 8.6347E−07 |

TABLE 24

| parameter | | | | | | |
|---|---|---|---|---|---|---|
| | f1 (mm) | f2 (mm) | f3 (mm) | f4 (mm) | f5 (mm) | f (mm) | TTL (mm) |
| value | 4.28 | 340.69 | −24.02 | 2.76 | −2.43 | 3.98 | 4.45 |

Figures 16A, 16B:
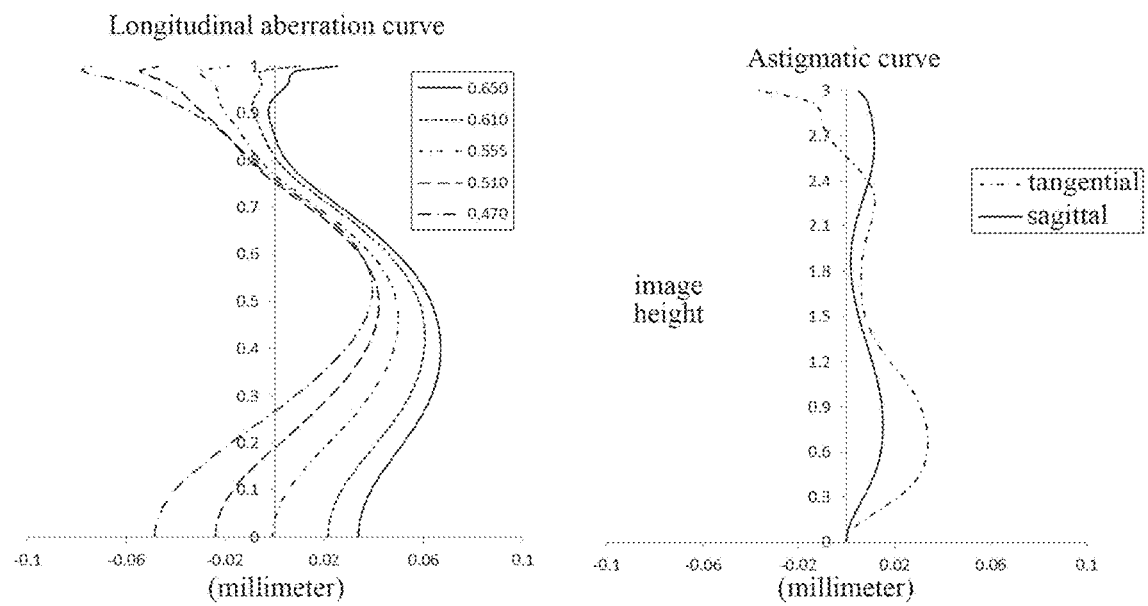
FIGS. 16A-16D respectively illustrate a longitudinal aberration curve, an astigmatic curve, a distortion curve and a relative illumination curve of the optical imaging lens assembly according to Embodiment 8.
Figures 16C, 16D:
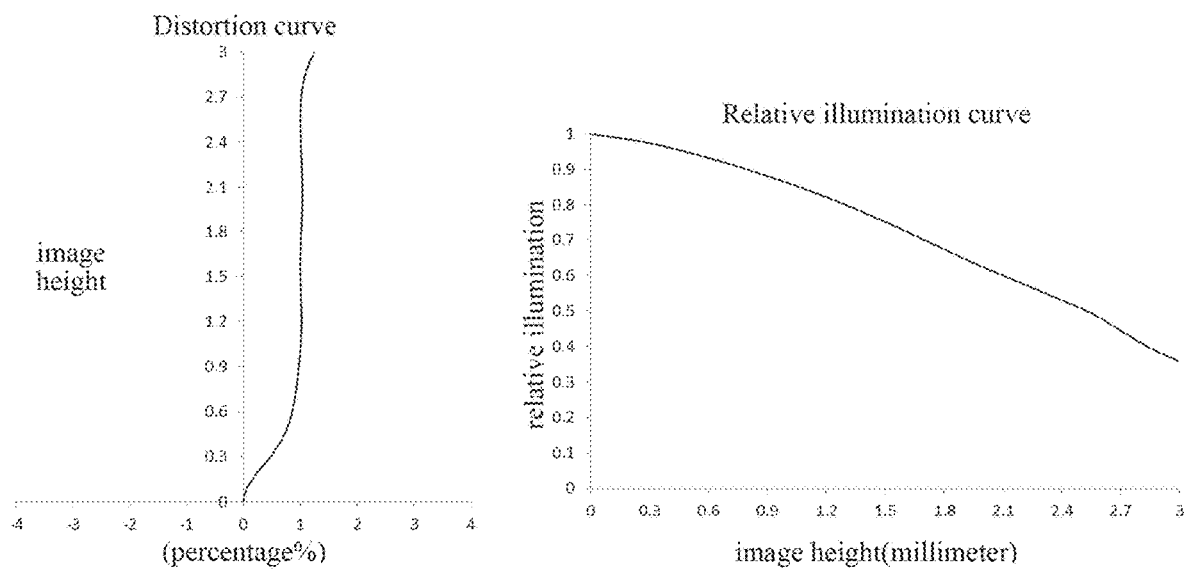

FIG. 16A shows a longitudinal aberration curve of the optical imaging lens assembly according to Embodiment 8, representing deviations of converged focal points of light of different wavelengths after passing through the lens assembly. FIG. 16B shows an astigmatic curve of the optical imaging lens assembly according to Embodiment 8, representing a curvature of a tangential image plane and a curvature of a sagittal image plane. FIG. 16C shows a distortion curve of the optical imaging lens assembly according to Embodiment 8, representing amounts of distortion at different viewing angles. FIG. 16D shows a relative illumination curve of the optical imaging lens assembly according to Embodiment 8, representing relative illuminations corresponding to different image heights on the image plane. According to FIG. 16A to FIG. 16D, it may be seen that the optical imaging lens assembly according to Embodiment 8 can achieve a good image quality.

To sum up, Embodiment 1 to Embodiment 8 satisfy the relationships shown in Table 25 below.

TABLE 25

| conditional formula | embodiment | | | | | | | |
|---|---|---|---|---|---|---|---|---|
| | 1 | 2 | 3 | 4 | 5 | 6 | 7 | 8 |
| f/EPD | 1.88 | 1.79 | 1.80 | 1.83 | 1.86 | 1.88 | 1.88 | 1.88 |
| f/f4 | 1.55 | 1.51 | 1.49 | 1.49 | 1.48 | 1.38 | 1.45 | 1.44 |
| f/f5 | −1.77 | −1.71 | −1.70 | −1.70 | −1.70 | −1.65 | −1.65 | −1.64 |
| f/|f2| | 0.05 | 0.07 | 0.08 | 0.09 | 0.09 | 0.04 | 0.05 | 0.01 |

TABLE 25-continued

| conditional formula | embodiment | | | | | | | |
|---|---|---|---|---|---|---|---|---|
| | 1 | 2 | 3 | 4 | 5 | 6 | 7 | 8 |
| f/f12 | 0.96 | 0.96 | 0.96 | 0.95 | 0.94 | 1.01 | 0.98 | 0.97 |
| |R2/R6| | 0.02 | 0.02 | 0.02 | 0.04 | 0.06 | 0.03 | 0.07 | 0.01 |
| CT3/|R5| | 0.03 | 0.03 | 0.03 | 0.03 | 0.03 | 0.02 | 0.02 | 0.03 |
| f/CT4 | 6.75 | 7.24 | 7.28 | 7.32 | 7.34 | 8.23 | 7.67 | 7.54 |
| R6/R7 | 1.66 | 0.39 | 0.95 | 0.00 | 0.00 | 0.00 | 0.70 | 9.62 |
| TTL/ImgH | 1.38 | 1.50 | 1.45 | 1.38 | 1.41 | 1.40 | 1.43 | 1.48 |

The present disclosure further provides an imaging device, having an electronic photosensitive element that may be a photosensitive charge-coupled device (CCD) or a complementary metal-oxide semiconductor (CMOS) element. The imaging device may be an independent camera device such as a digital camera, or may be an imaging module integrated in a mobile electronic device such as a mobile phone. The imaging device is equipped with the optical imaging lens assembly described above.

The foregoing is only a description of the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to) technical features within similar functions.

What is claimed is:

1. An optical imaging lens assembly comprising, sequentially from an object side to an image side along an optical axis, a first lens, a second lens, a third lens, a fourth lens and a fifth lens,
   wherein the first lens has a positive refractive power, an object-side surface of the first lens is a convex surface, and an image-side surface of the first lens is a concave surface;
   the second lens has a positive refractive power or a negative refractive power;
   the third lens has a negative refractive power;
   the fourth lens has a positive refractive power;
   the fifth lens has a negative refractive power, and an image-side surface of the fifth lens is a convex surface; and
   a total effective focal length f of the optical imaging lens assembly and an entrance pupil diameter EPD of the optical imaging lens assembly satisfy: f/EPD≤1.9,
   wherein the total effective focal length f of the optical imaging lens assembly and an effective focal length f2 of the second lens satisfy: f/|f2|≤0.1.

2. The optical imaging lens assembly according to claim 1, wherein a combined refractive power of the first lens and the second lens is a positive refractive power, and a combined focal length f12 of the first lens and the second lens and the total effective focal length f of the optical imaging lens assembly satisfy: 0.8<f/f12<1.2.

3. The optical imaging lens assembly according to claim 1, wherein the total effective focal length f of the optical imaging lens assembly and an effective focal length f4 of the fourth lens satisfy: 1.3≤f/f4≤1.6.

4. The optical imaging lens assembly according to claim 1, wherein the total effective focal length f of the optical imaging lens assembly and an effective focal length f5 of the fifth lens satisfy: −1.8≤f/f5≤−1.5.

5. The optical imaging lens assembly according to claim 1, wherein a radius of curvature R2 of the image-side surface of the first lens and a radius of curvature R6 of an image-side surface of the third lens satisfy: |R2/R6|≤0.1.

6. The optical imaging lens assembly according to claim 5, wherein the radius of curvature R6 of the image-side surface of the third lens and a radius of curvature R7 of an object-side surface of the fourth lens satisfy: 0≤R6/R7<10.

7. The optical imaging lens assembly according to claim 1, wherein a center thickness CT3 of the third lens on the optical axis and a radius of curvature R5 of an object-side surface of the third lens satisfy: CT3/|R5|<0.1.

8. The optical imaging lens assembly according to claim 1, wherein the total effective focal length f of the optical imaging lens assembly and a center thickness CT4 of the fourth lens on the optical axis satisfy: 6<f/CT4<9.

9. The optical imaging lens assembly according to claim 1, wherein, TTL/ImgH<1.6,
   TTL is a distance from a center of the object-side surface of the first lens to an image plane of the optical imaging lens assembly on the optical axis; and
   ImgH is half of a diagonal length of an effective pixel area on the image plane of the optical imaging lens assembly.

10. An optical imaging lens assembly comprising, sequentially from an object side to an image side along an optical axis, a first lens, a second lens, a third lens, a fourth lens and a fifth lens,
    wherein at least one of the first lens and the fourth lens has a positive refractive power;
    at least one of the third lens and the fifth lens has a negative refractive power;
    the second lens has a positive refractive power or a negative refractive power, and an effective focal length f2 of the second lens and a total effective focal length f of the optical imaging lens assembly satisfy: f/|f2|≤0.1; and
    a combined refractive power of the first lens and the second lens is a positive refractive power, and a combined focal length f12 of the first lens and the second lens and the total effective focal length f of the optical imaging lens assembly satisfy: 0.8<f/f12<1.2.

11. The optical imaging lens assembly according to claim 10, wherein an object-side surface of the first lens is a convex surface, and an image-side surface of the first lens is a concave surface.

12. The optical imaging lens assembly according to claim 11, wherein a radius of curvature R2 of the image-side surface of the first lens and a radius of curvature R6 of an image-side surface of the third lens satisfy: |R2/R6|≤0.1.

13. The optical imaging lens assembly according to claim 10, wherein an image-side surface of the fifth lens is a convex surface.

14. The optical imaging lens assembly according to claim 10, wherein each of the first lens and the fourth lens has a positive refractive power.

15. The optical imaging lens assembly according to claim 14, wherein the total effective focal length f of the optical imaging lens assembly and an effective focal length f4 of the fourth lens satisfy: $1.3 \leq f/f4 \leq 1.6$.

16. The optical imaging lens assembly according to claim 14, wherein the total effective focal length f of the optical imaging lens assembly and a center thickness CT4 of the fourth lens on the optical axis satisfy: $6 < f/CT4 < 9$.

17. The optical imaging lens assembly according to claim 10, wherein each of the third lens and the fifth lens has a negative refractive power.

18. The optical imaging lens assembly according to claim 17, wherein the total effective focal length f of the optical imaging lens assembly and an effective focal length f5 of the fifth lens satisfy: $-1.8 \leq f/f5 \leq -1.5$.

19. The optical imaging lens assembly according to claim 17, wherein a center thickness CT3 of the third lens on the optical axis and a radius of curvature R5 of an object-side surface of the third lens satisfy: $CT3/|R5| \leq 0.1$.

20. The optical imaging lens assembly according to claim 10, wherein a radius of curvature R6 of an image-side surface of the third lens and a radius of curvature R7 of an object-side surface of the fourth lens satisfy: $0 \leq R6/R7 < 10$.

21. The optical imaging lens assembly according to claim 10, wherein, $TTL/ImgH < 1.6$,
    TTL is a distance from a center of an object-side surface of the first lens to an image plane of the optical imaging lens assembly on the optical axis; and
    ImgH is half of a diagonal length of an effective pixel area on the image plane of the optical imaging lens assembly.

22. The optical imaging lens assembly according to claim 21, wherein the total effective focal length f of the optical imaging lens assembly and an entrance pupil diameter EPD of the optical imaging lens assembly satisfy: $f/EPD \leq 1.9$.

* * * * *